US009804598B2

(12) United States Patent
Yoshino

(10) Patent No.: US 9,804,598 B2
(45) Date of Patent: Oct. 31, 2017

(54) AUTONOMOUS MOBILE BODY

(71) Applicant: Sharp Kabushiki Kaisha, Osaka-shi, Osaka (JP)

(72) Inventor: Shoki Yoshino, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 118 days.

(21) Appl. No.: 14/898,530

(22) PCT Filed: Jun. 17, 2014

(86) PCT No.: PCT/JP2014/066033
§ 371 (c)(1),
(2) Date: Dec. 15, 2015

(87) PCT Pub. No.: WO2015/025599
PCT Pub. Date: Feb. 26, 2015

(65) Prior Publication Data
US 2016/0132056 A1  May 12, 2016

(30) Foreign Application Priority Data

Aug. 21, 2013  (JP) ................................. 2013-171412

(51) Int. Cl.
*G01C 22/00* (2006.01)
*G05D 1/00* (2006.01)
(Continued)

(52) U.S. Cl.
CPC ........ *G05D 1/0088* (2013.01); *A47L 11/4008* (2013.01); *A47L 11/4011* (2013.01);
(Continued)

(58) Field of Classification Search
CPC .... G05D 1/0088; G05D 1/024; G05D 1/0274; G05D 2201/0203; A47L 11/4008;
(Continued)

(56) References Cited

U.S. PATENT DOCUMENTS

| 5,926,518 A | 7/1999 | Asokawa |
| 2013/0166134 A1* | 6/2013 | Shitamoto .............. G05D 1/024 701/26 |
| 2014/0022110 A1* | 1/2014 | Itohara .................... G01S 7/295 342/107 |

FOREIGN PATENT DOCUMENTS

| JP | 10-049718 A | 2/1998 |
| JP | 2008-040677 A | 2/2008 |

(Continued)

OTHER PUBLICATIONS

Official Communication issued in International Patent Application No. PCT/JP2014/066033, dated Sep. 30, 2014.
(Continued)

*Primary Examiner* — Calvin Cheung
*Assistant Examiner* — Paula L Schneider
(74) *Attorney, Agent, or Firm* — Keating & Bennett, LLP

(57) ABSTRACT

According to an autonomous mobile body of the present invention, a self-position recognizing section (42*a*) of a cleaning robot (1) includes a clustering section (42*ab*) for (i) grouping distance measurement points of each of a plurality of obstacles into clusters, the distance measurement points having been measured by use of a beam emitted from the sensor section (41) and (ii) recognizing the each of the plurality of obstacles.

5 Claims, 15 Drawing Sheets

(51) Int. Cl.
| | |
|---|---|
| *G01S 17/08* | (2006.01) |
| *G01S 17/42* | (2006.01) |
| *G01S 17/88* | (2006.01) |
| *G01S 17/89* | (2006.01) |
| *G01S 7/48* | (2006.01) |
| *G05D 1/02* | (2006.01) |
| *A47L 11/40* | (2006.01) |

(52) U.S. Cl.
CPC ............ *G01S 7/4808* (2013.01); *G01S 17/08* (2013.01); *G01S 17/42* (2013.01); *G01S 17/88* (2013.01); *G01S 17/89* (2013.01); *G05D 1/024* (2013.01); *G05D 1/0274* (2013.01); *A47L 2201/04* (2013.01); *G05D 2201/0203* (2013.01)

(58) Field of Classification Search
CPC ............ A47L 11/4011; A47L 2201/04; G01S 7/4808; G01S 17/08; G01S 17/42; G01S 17/88; G01S 17/89

USPC ........................................................ 701/23
See application file for complete search history.

(56) References Cited

FOREIGN PATENT DOCUMENTS

| | | |
|---|---|---|
| JP | 2008-225852 A | 9/2008 |
| JP | 2009-169845 A | 7/2009 |
| JP | 2012-022467 A | 2/2012 |
| JP | 2012-133617 A | 7/2012 |
| JP | 2015-001820 A | 1/2015 |
| WO | 2012/086029 A1 | 6/2012 |
| WO | 2012/128096 A1 | 9/2012 |

OTHER PUBLICATIONS

Fujiwara, "Detection of human and wall while laser range sensor is moving", Proceedings of The 30th Annual Conference of the Robotics Society of Japan, Sep. 17, 2012, 4 pages.

\* cited by examiner

41a

SOLID LINE: LASER BEAM DIRECTION IN WHICH LASER RANGE FINDER HAS SUCCESSFULLY MEASURED DISTANCE
BROKEN LINE: LASER BEAM DIRECTION IN WHICH LASER RANGE FINDER HAS FAILED TO MEASURE DISTANCE
DASH-DOT LINE: OBSTACLE CLUSTER

SOLID LINE: LASER BEAM DIRECTION IN WHICH LASER RANGE FINDER HAS SUCCESSFULLY MEASURED DISTANCE
BROKEN LINE: LASER BEAM DIRECTION IN WHICH LASER RANGE FINDER HAS FAILED TO MEASURE DISTANCE
DASH-DOT LINE: OBSTACLE CLUSTER

FIG. 10

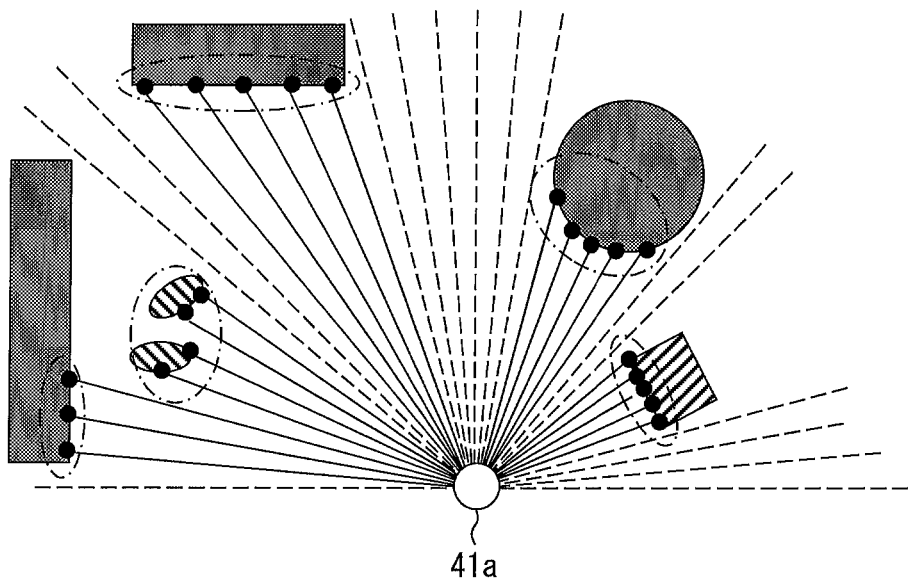

41a

ACTUAL MEASUREMENT ENVIRONMENT

SOLID LINE: LASER BEAM DIRECTION IN WHICH LASER RANGE FINDER HAS SUCCESSFULLY MEASURED DISTANCE
BROKEN LINE: LASER BEAM DIRECTION IN WHICH LASER RANGE FINDER HAS FAILED TO MEASURE DISTANCE
DASH-DOT LINE: OBSTACLE CLUSTER
SHADED REGION: OBSTACLE EXISTING IN ENVIRONMENTAL MAP
HATCHED REGION: OBSTACLE NOT EXISTING IN ENVIRONMENTAL MAP

41a

A CASE WHERE TEMPORARY CURRENT POSITION OF
CLEANING ROBOT IS CORRECT

SOLID LINE: LASER BEAM DIRECTION IN WHICH LASER RANGE FINDER HAS
SUCCESSFULLY MEASURED DISTANCE
BROKEN LINE: LASER BEAM DIRECTION IN WHICH LASER RANGE FINDER
HAS FAILED TO MEASURE DISTANCE
DASH-DOT LINE: OBSTACLE CLUSTER
SHADED REGION: OBSTACLE EXISTING IN ENVIRONMENTAL MAP

41a

A CASE WHERE TEMPORARY
CURRENT POSITION OF
CLEANING ROBOT IS INCORRECT

SOLID LINE: LASER BEAM DIRECTION IN WHICH LASER RANGE FINDER HAS SUCCESSFULLY MEASURED DISTANCE
BROKEN LINE: LASER BEAM DIRECTION IN WHICH LASER RANGE FINDER HAS FAILED TO MEASURE DISTANCE
DASH-DOT LINE: OBSTACLE CLUSTER
SHADED REGION: OBSTACLE EXISTING IN ENVIRONMENTAL MAP

FIG. 13

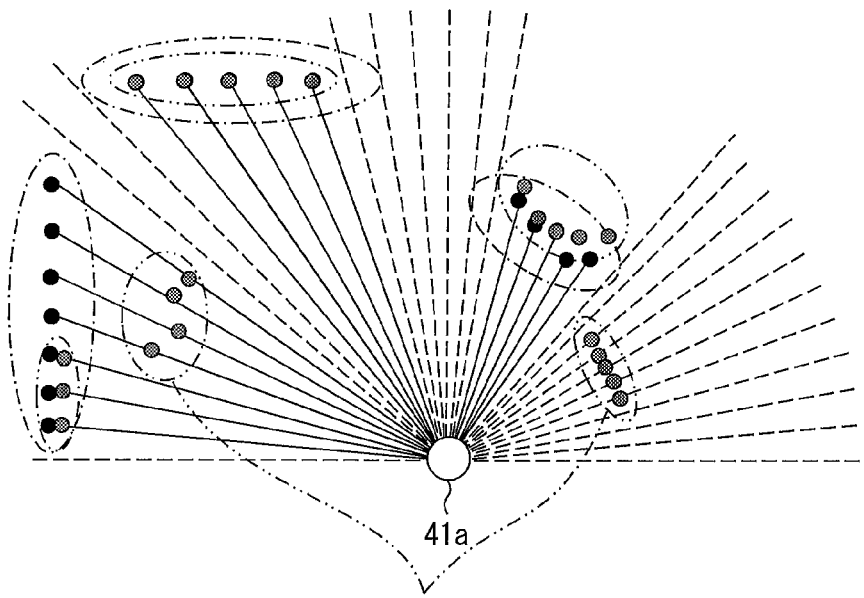

OBSTACLE CLUSTERS NOT COINCIDING WITH OBSTACLE CLUSTERS
CALCULATED IN ACCORDANCE WITH ENVIRONMENT MAP
RELIABILITY LEVEL 0

SOLID LINE: LASER BEAM DIRECTION IN WHICH LASER RANGE FINDER HAS
SUCCESSFULLY MEASURED DISTANCE
BROKEN LINE: LASER BEAM DIRECTION IN WHICH LASER RANGE FINDER HAS FAILED
TO MEASURE DISTANCE
DASH-DOT LINE: OBSTACLE CLUSTER CALCULATED IN ACCORDANCE WITH ENVIRONMENT
MAP
BLACK DOT: OBSTACLE MEASUREMENT POINT CALCULATED IN ACCORDANCE WITH
ENVIRONMENT MAP
DASH-DOT-DOT LINE: OBSTACLE CLUSTER MEASURED BY LASER RANGE FINDER IN
ACTUAL ENVIRONMENT
GRAY DOT: OBSTACLE MEASUREMENT POINT DETECTED BY LASER RANGE FINDER IN
ACTUAL ENVIRONMENT

FIG. 14

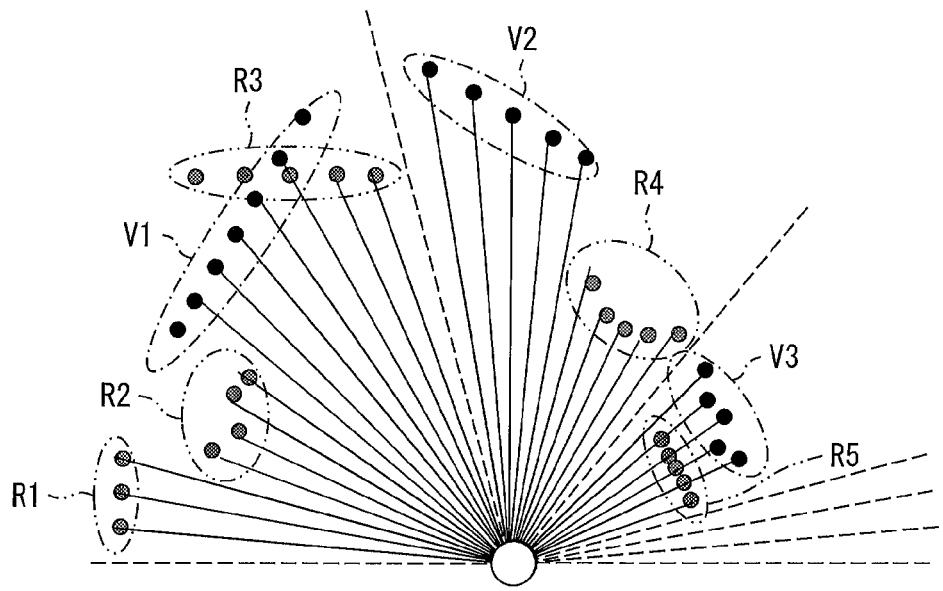

SOLID LINE: LASER BEAM DIRECTION IN WHICH LASER RANGE FINDER HAS SUCCESSFULLY MEASURED DISTANCE
BROKEN LINE: LASER BEAM DIRECTION IN WHICH LASER RANGE FINDER HAS FAILED TO MEASURE DISTANCE
DASH-DOT LINE: OBSTACLE CLUSTER CALCULATED IN ACCORDANCE WITH ENVIRONMENT MAP
BLACK DOT: OBSTACLE MEASUREMENT POINT CALCULATED IN ACCORDANCE WITH ENVIRONMENT MAP
DASH-DOT-DOT LINE: OBSTACLE CLUSTER MEASURED BY LASER RANGE FINDER IN ACTUAL ENVIRONMENT
GRAY DOT: OBSTACLE MEASUREMENT POINT MEASURED BY LASER RANGE FINDER IN ACTUAL ENVIRONMENT

TYPES OF CLUSTERS
R1 : STRAIGHT LINE CLUSTER
R2 : OTHER-TYPE CLUSTER
R3 : STRAIGHT LINE CLUSTER
R4 : CURVED LINE CLUSTER
R5 : STRAIGHT LINE CLUSTER
V1 : STRAIGHT LINE CLUSTER
V2 : STRAIGHT LINE CLUSTER
V3 : CURVED LINE CLUSTER

AUTONOMOUS MOBILE BODY

TECHNICAL FIELD

The present invention relates to an autonomous mobile body, such as a cleaning robot, which is autonomously movable.

BACKGROUND ART

There have been conventionally known autonomous mobile bodies, such as autonomous moving-type robots, which are autonomously movable according to information on a surrounding environment in a limited region inside or outside of a building.

Such an autonomous mobile body creates, in a movement region in a prestored environment map, a movement path extending from a current position of the autonomous mobile body to a specific target point. This allows the autonomous mobile body to autonomously move in accordance with the movement path. Therefore, an autonomous mobile body typically has a function of recognizing a self-position in a movement region.

In order for an autonomous mobile body to recognize a self-position, the autonomous mobile body needs to compare an environment map with environment information which is obtained by a sensor provided in the autonomous mobile body. Various methods have been studied for carrying out the comparison.

Note that in a case where the autonomous mobile body recognizes a self-position, an actual environment in which the autonomous mobile body autonomously moves may be inconsistent with the environment map due to factors such as (i) a measurement error in creating the environment map, (ii) an environmental difference between a timing at which the environment map has been created and a timing at which the autonomous mobile body autonomously moves, and/or (iii) presence of a mobile body, such as a human, other than the autonomous mobile body itself. According to a conventional autonomous mobile body, it may not be possible to properly correct a self-position due to such an inconsistency.

Examples of known techniques for solving the problem encompass a self-position estimating device disclosed in Patent Literature 1. According to the self-position estimating device disclosed in Patent Literature 1, landmarks such as a sign, a traffic signal, a telegraph pole, and the like provided on a roadside are designated as landmarks which may be moved, and reliability levels of the respective designated landmarks are calculated. In a case where the self-position estimating device estimates a self-position, landmarks having higher reliability levels are given influences greater than those given to landmarks having lower reliability levels. This allows the self-position estimating device to stably estimate a self-position even in an environment in which there is/are a landmark(s) having a low reliability level(s).

CITATION LIST

Patent Literature

Patent Literature 1
Japanese Patent Application Publication, Tokukai, No. 2008-40677 (Publication date: Feb. 21, 2008)

SUMMARY OF INVENTION

Technical Problem

The conventional self-position estimating device disclosed in Patent Literature 1 employs a camera as a sensor for detecting a landmark. In a case where a sensor such as a camera is thus employed, landmarks may be individually associated with an environment map. Therefore, if a proper number of reliable landmarks are detected, then it is possible to properly compare the landmarks with the environment map.

A method, in which an image captured by a camera serving as a sensor is used, typically poses (i) a problem of being influenced by environmental light and (ii) a problem in accuracy. That is, in a case where an image is captured with a camera in a dark environment, the image becomes dark and therefore recognition accuracy deteriorates.

Meanwhile, a laser range finder, which is capable of accurately measuring a distance to an obstacle, has recently been employed as a sensor used to carry out position correction. However, in a case where an autonomous mobile body estimates a self-position by use of a laser range finder, landmarks are obstacles and therefore do not exist in an environment map. This prevents landmarks, which have been detected as obstacles, from being individually associated with the environment map, and therefore prevents the self-position of the autonomous mobile body from being estimated.

Therefore, an accurate current position of the autonomous mobile body is required in order to distinguish, from the obstacles measured by the laser range finder, an obstacle which causes reliability to deteriorate, such as (i) an obstacle which does not exist in the environment map and (ii) an obstacle which is located at a position in the environment map which position differs from a position of the obstacle determined by the laser range finder. Therefore, the autonomous mobile body calculates a temporary current position of the autonomous mobile body in accordance with an immediately preceding position of the autonomous mobile body. The autonomous mobile body can then calculate, at the temporary current position, a position of an obstacle in the environment map. This allows an obstacle, which has been measured by the laser range finder, to be excluded as an obstacle not existing in the environment map, due to a difference between the temporary current position of the autonomous mobile body and the position of the obstacle.

However, there are cases where an autonomous mobile body temporarily estimates an inaccurate self-position. In such a case, due to inaccuracy of the temporary current position of the autonomous mobile body, even an obstacle existing in the environment map may unfortunately be treated as an obstacle not existing in the environment map. This may cause further inaccurate position estimation.

The present invention has been made in view of the conventional problems, and an object of the present invention is to provide an autonomous mobile body capable of (i) reducing a probability of treating, as an obstacle not existing in an environment map, an obstacle existing in the environment map and (ii) improving accuracy of position estimation.

Solution to Problem

In order to attain the object, an autonomous mobile body of an aspect of the present invention is an autonomous mobile body which moves in a movement region while recognizing a self-position of the autonomous mobile body, the autonomous mobile body including: a sensor section for measuring, by emitting a beam, a distance from the sensor section to each of a plurality of obstacles located in the movement region; and a self-position recognizing section for recognizing the self-position by (i) calculating a self-position candidate in accordance with the distance and designating the distance as a sensor distance, (ii) comparing the sensor distance with a map distance which extends from the self-position candidate to the each of the plurality of obstacles and which is calculated in accordance with an environment map containing information on a position of the each of the plurality of obstacles and (iii) correcting the self-position candidate, the self-position recognizing section including a clustering section for (i) grouping distance measurement points of the each of the plurality of obstacles into clusters, the distance measurement points having been measured by use of a beam emitted from the sensor section and (ii) recognizing the each of the plurality of obstacles.

Advantageous Effects of Invention

The present invention brings about an effect of providing an autonomous mobile body capable of (i) reducing a probability of treating, as an obstacle not existing in an environment map, an obstacle existing in the environment map and (ii) improving accuracy of position estimation.

Figure 2:
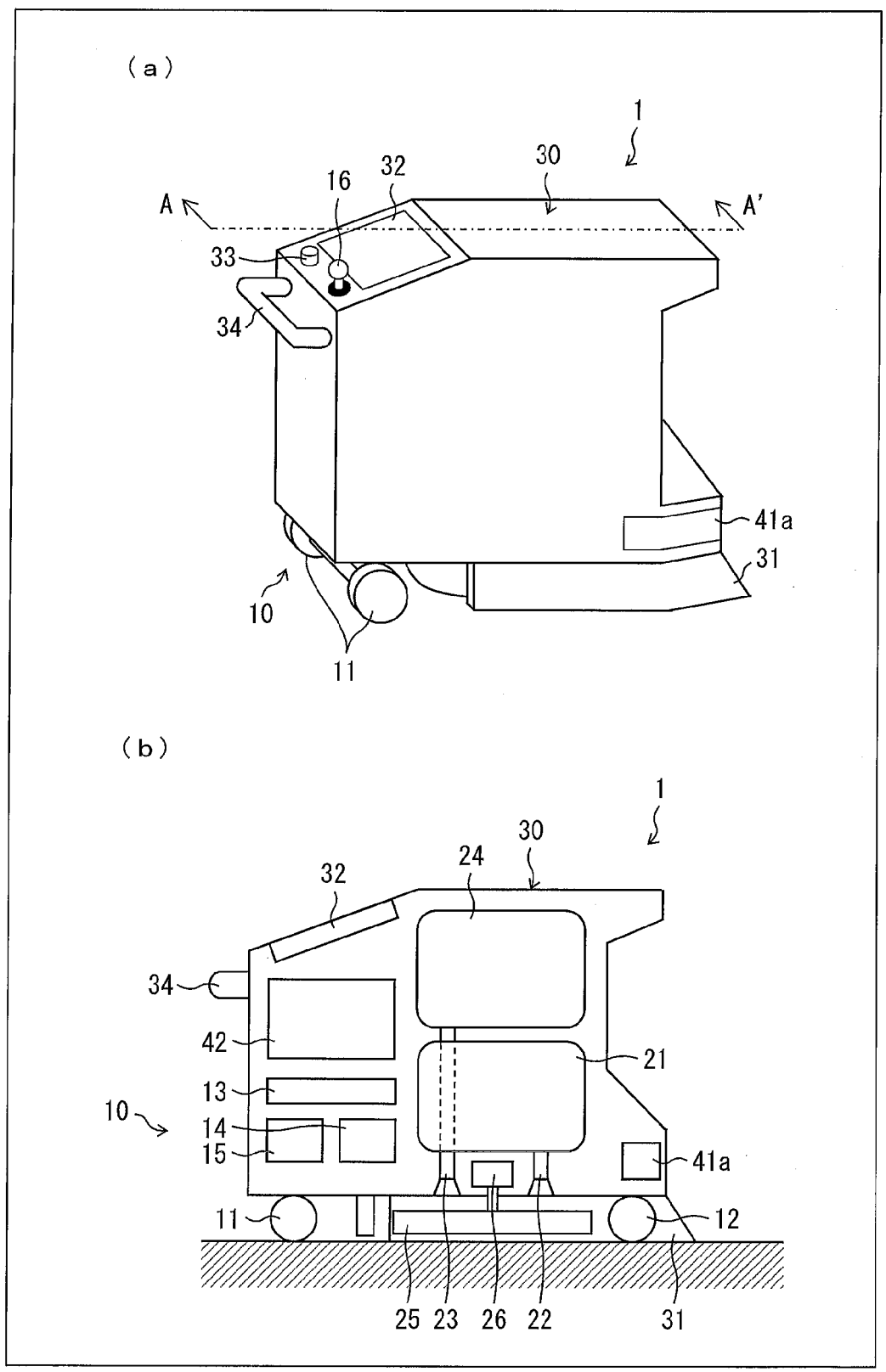

(a) of FIG. 2 is a perspective view illustrating a configuration of the cleaning robot. (b) of FIG. 2 is a cross sectional view, taken along a cutting line A-A' shown in (a) of FIG. 2.

Figure 3:
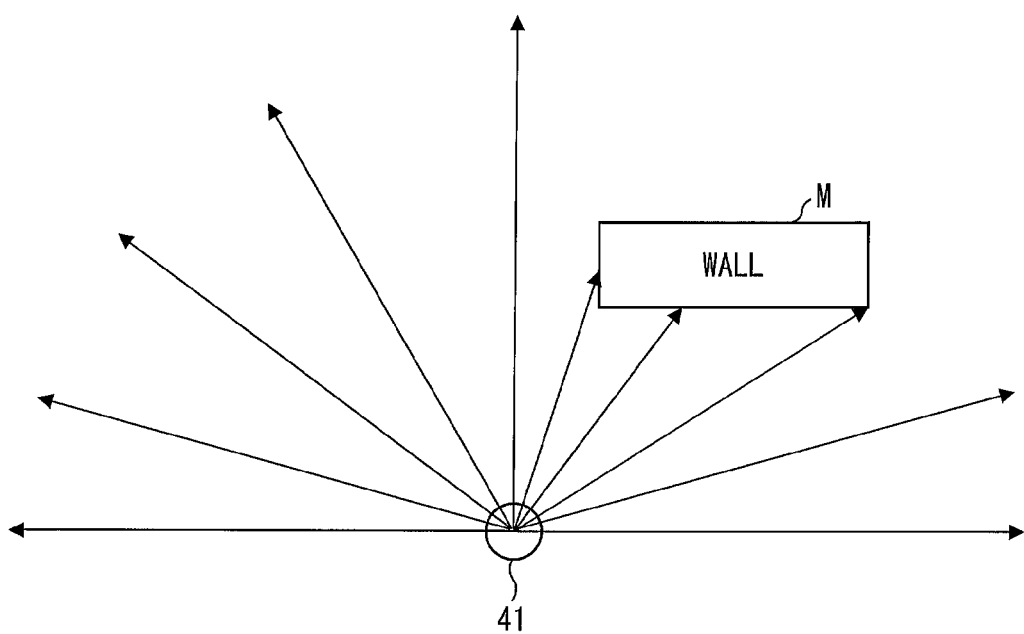

FIG. 3 is a plan view illustrating how a wall serving as a distance measurement object is irradiated with a laser beam which has been emitted from a laser range finder of the cleaning robot.

Figure 4:
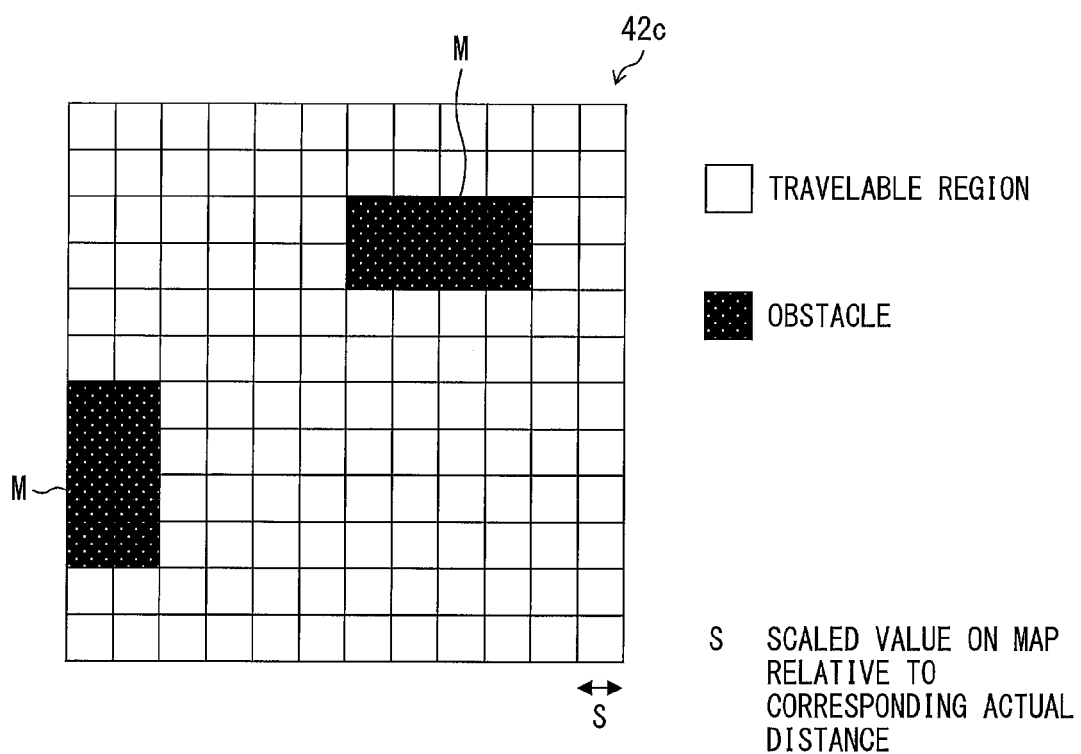

FIG. 4 is a plan view illustrating a grid map serving as an environment map used for autonomous movement of the cleaning robot.

Figure 5:
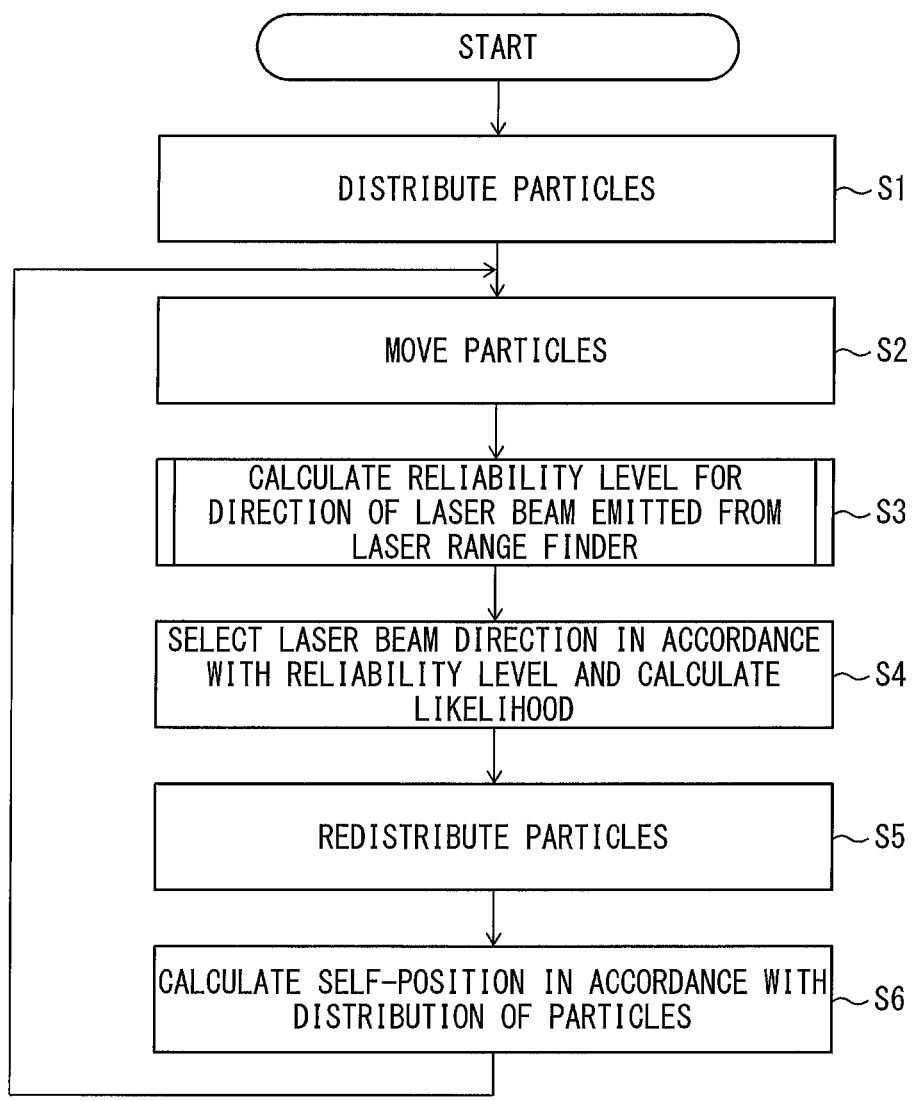

FIG. 5 is a flow chart showing an operation for obtaining a self-position of the cleaning robot, which operation uses an algorithm of a Monte Carlo Localization method (MCL method).

Figure 6:
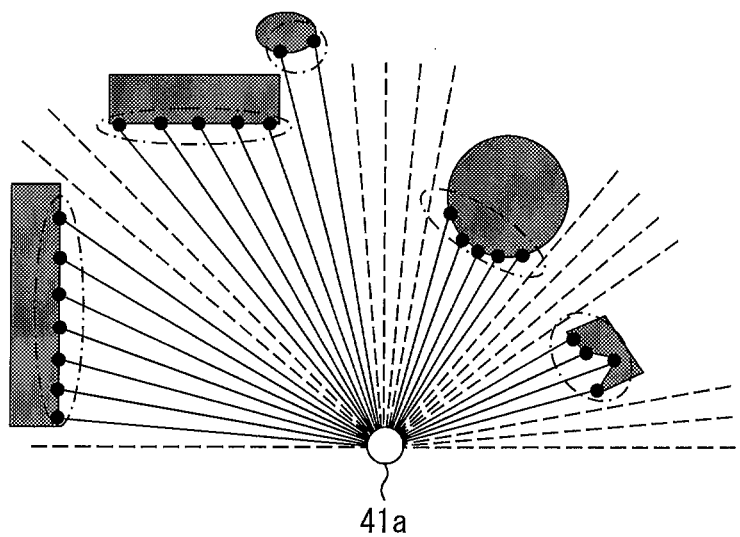

FIG. 6 is a plan view illustrating how particles are redistributed in accordance with likelihood of the particles which likelihood is used in the Monte Carlo Localization method.

Figure 7:
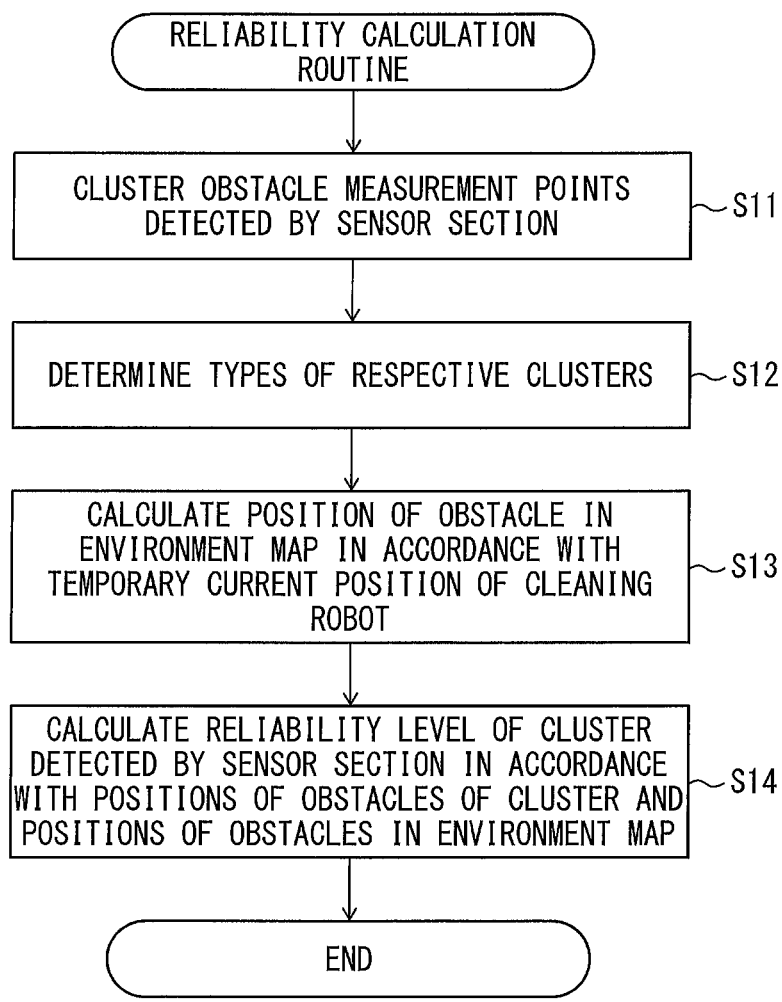

FIG. 7 is a flow chart showing a reliability calculation routine used in the Monte Carlo Localization method.

Figure 8:
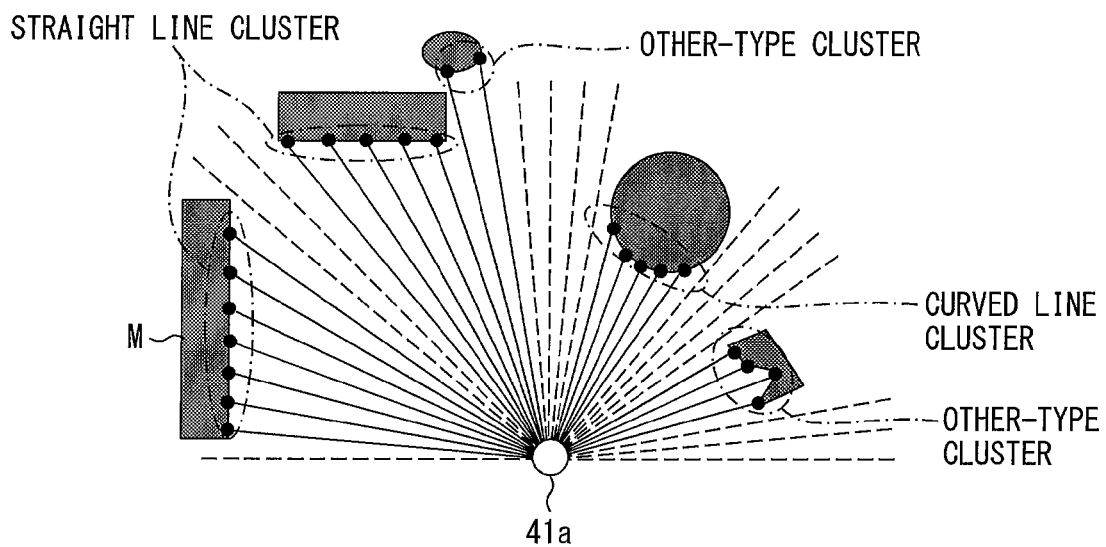

FIG. 8 is a plan view illustrating how obstacle measurement points, which have been detected by the sensor section of the cleaning robot, are clustered.

Figure 9:
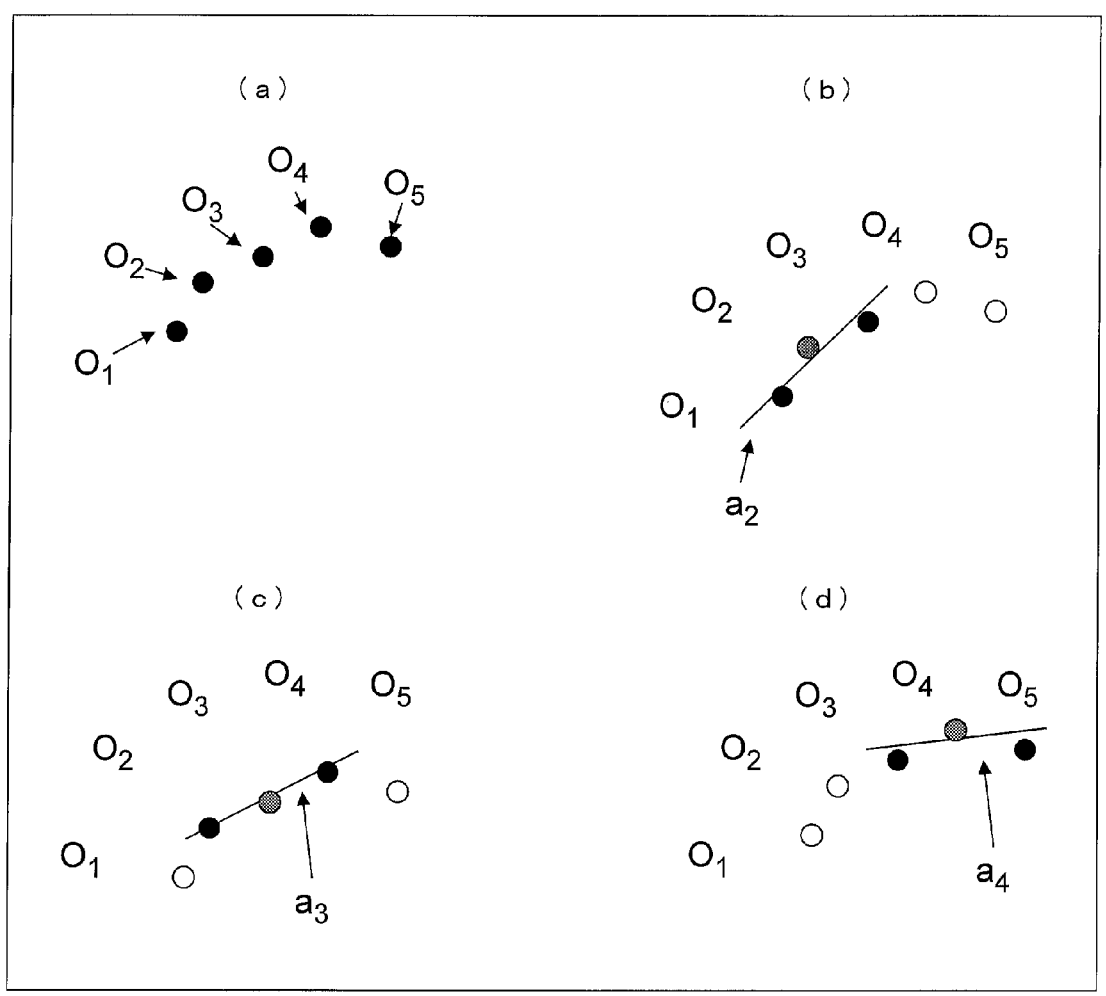

FIG. 9 shows, in (a) through (d), a plan view illustrating how obstacle clusters detected by the sensor section are classified by types.

FIG. 10 is a plan view illustrating how the laser range finder carries out measurement in an actual environment.

Figure 11:
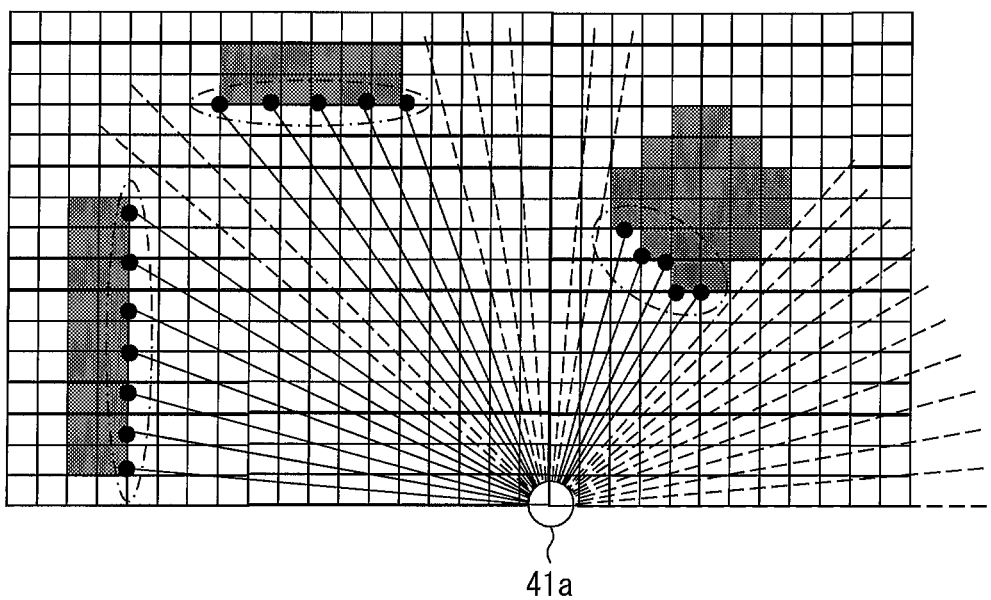

FIG. 11 is a plan view illustrating a case where obstacle measurement points are clustered based on results of calculating positions of obstacles in an environment map in a case where a temporary current position of the cleaning robot is correct.

Figure 12:
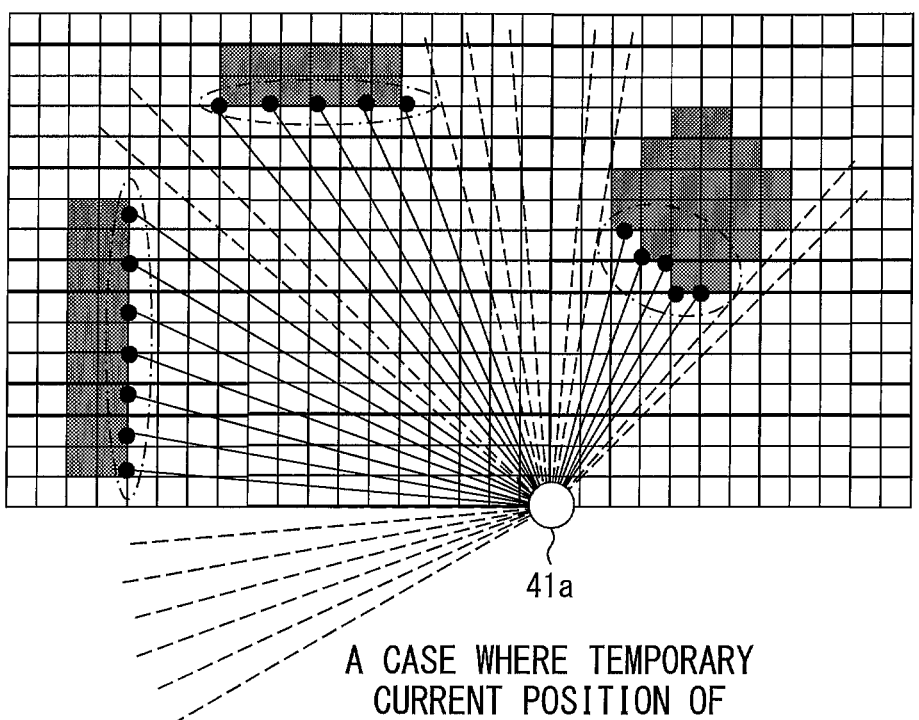

FIG. 12 is a plan view illustrating a case where obstacle measurement points are clustered based on results of calculating positions of obstacles in an environment map in a case where a temporary current position of the cleaning robot is incorrect.

FIG. 13 is a plan view illustrating how the positions of the obstacle measurement points illustrated in FIG. 11 are superimposed on the positions of the obstacle measurement points illustrated in FIG. 12.

FIG. 14 is a plan view illustrating how the positions of the obstacle measurement points illustrated in FIG. 11 are superimposed on the positions of the obstacle measurement points illustrated in FIG. 13.

Figure 15:
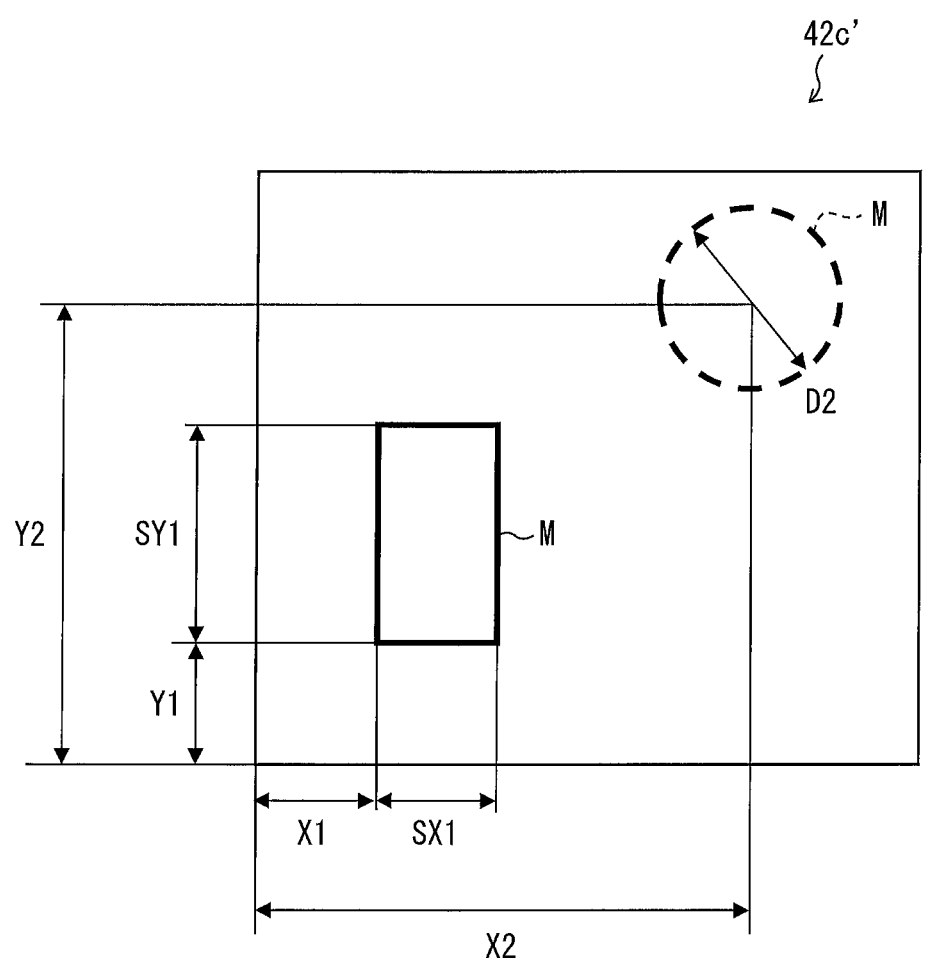

FIG. 15 is a plan view illustrating a configuration of an environment map of a cleaning robot which is an example of an autonomous mobile body of Embodiment 2 of the present invention.

Figure 16:
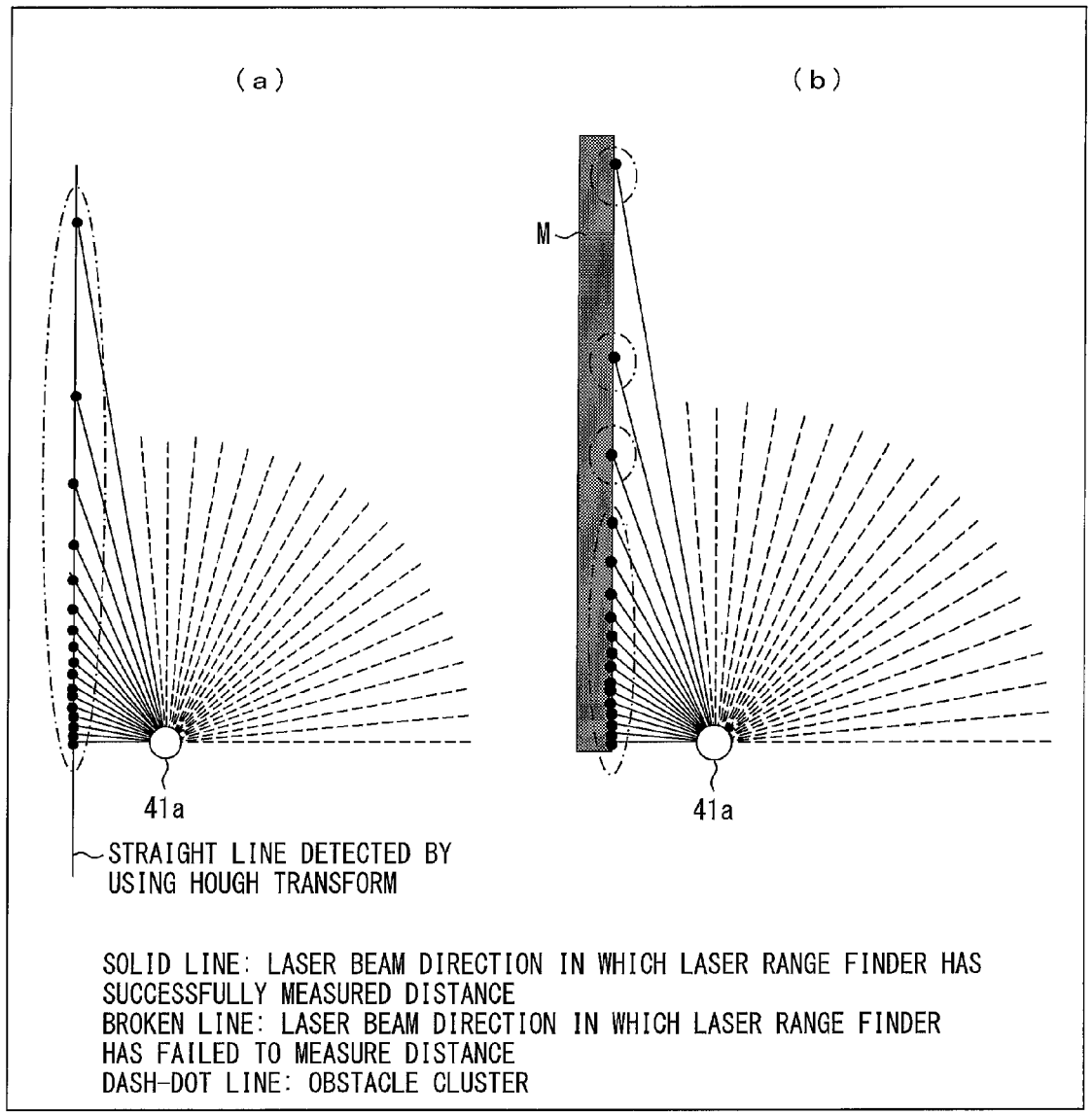

(a) of FIG. 16 is a plan view for describing standards according to a cleaning robot of Embodiment 3 of the present invention, which standards employ a method of treating, as a cluster, object measurement points located near a detected straight line or circle. (b) of FIG. 16 is a plan view for describing a method of the cleaning robot of Embodiment 1 which method (i) is carried out by a self-position recognizing section and (ii) is carried out such that in a case where a distance between adjacent obstacle measurement points is less than a threshold with respect to a measurement direction of the laser range finder such adjacent obstacle measurement points are treated as one cluster.

DESCRIPTION OF EMBODIMENTS

Embodiment 1

The following description discusses an embodiment of the present invention with reference to FIGS. 1 through 14. Embodiment 1 shows a cleaning robot as an example of an autonomous mobile body. Note, however, that the present invention is not limited to the cleaning robot.

First, the following description discusses, with reference to (a) and (b) of FIG. 2, a configuration of the cleaning robot of Embodiment 1 which cleaning robot serves as an autonomous mobile body. (a) of FIG. 2 is a perspective view illustrating the configuration of the cleaning robot. (b) of FIG. 2 is a cross sectional view, taken along a cutting line A-A' shown in (a) of FIG. 2.

A cleaning robot 1 of Embodiment 1 includes a driving mechanism 10, a cleaning mechanism 20, a housing 30, and a sensor mechanism 40 as illustrated in (a) and (b) of FIG. 2.

The driving mechanism 10 includes (i) two driving wheels 11 which are provided on right and left sides of a back bottom part of the cleaning robot 1, (ii) trailing wheels 12 which are rotatably provided on a front bottom part of the cleaning robot 1, (iii) a battery 13 for supplying operating power to the cleaning robot 1, (iv) a driving wheel motor 14 for driving the driving wheels 11, (v) an encoder 15 for measuring the number of revolutions of each of the driving wheels 11, and (vi) a travel control lever 16 for determining a traveling direction of the cleaning robot 1 in manual traveling.

The cleaning mechanism 20 includes (i) a washing liquid tank 21 for storing a washing liquid and (ii) a washing liquid discharge section 22 connected to the washing liquid tank 21. The washing liquid tank 21 and the washing liquid discharge section 22 are connected to each other by a cylindrical pipe, so as to constitute a washing liquid discharge unit.

The cleaning mechanism 20 further includes (i) a waste liquid suction port 23 for sucking, into the cleaning robot 1, a waste liquid including dust, dirt, and the like and (ii) a waste liquid tank 24 for storing the waste liquid thus sucked in. The waste liquid suction port 23 and the waste liquid tank 24 are connected to each other by a pipe, so as to constitute a waste liquid collection unit. The cleaning mechanism 20 further includes (i) a cleaning brush 25 provided near the washing liquid discharge section 22 and (ii) a brush motor 26 for driving the cleaning brush 25. The brush motor 26 includes a rotary encoder (not illustrated) so as to be capable of measuring the number of revolutions of the motor.

The above mechanisms are entirely covered with the housing 30. The housing 30 includes a protection member 31, provided on a front end of the bottom part of the cleaning robot 1, which (i) prevents the washing liquid from being scattered and (ii) prevents a foreign object from being caught in the cleaning robot 1. The housing 30 further includes (i) an operation panel 32 for setting various modes, switching between automatic traveling and manual traveling, switching between traveling and stopping, and the like, (ii) an emergency stop switch 33 for stopping the cleaning robot 1 in an emergency, (iii) a handle 34 for allowing an operator to support the cleaning robot body during the manual traveling, and (iv) the travel control lever 16.

Note that a form of the cleaning robot 1 is not limited to the type in which washing is carried out by use of a washing liquid as described above. The cleaning robot 1 can be a robot such as a so-called household vacuum cleaner including a fan, a dust collecting chamber, a suction port, and the like.

The cleaning robot 1 thus configured individually controls driving amounts of the respective driving wheels 11. This allows the cleaning robot 1 to carry out a moving operation, such as straight forward movement, curve movement (circling), reversing, and rotating in place (circling around a middle point of a line segment connecting centers of the driving wheels). The cleaning robot 1 is realized as an autonomous moving-type mobile body which autonomously (i) creates a movement path to a specified destination in a movement region and (ii) moves so as to follow the movement path. Therefore, the cleaning robot 1 of Embodiment 1 includes, as part of the sensor mechanism 40, a sensor section 41 and a computing section 42.

(Sensor Section)

Figure 1:
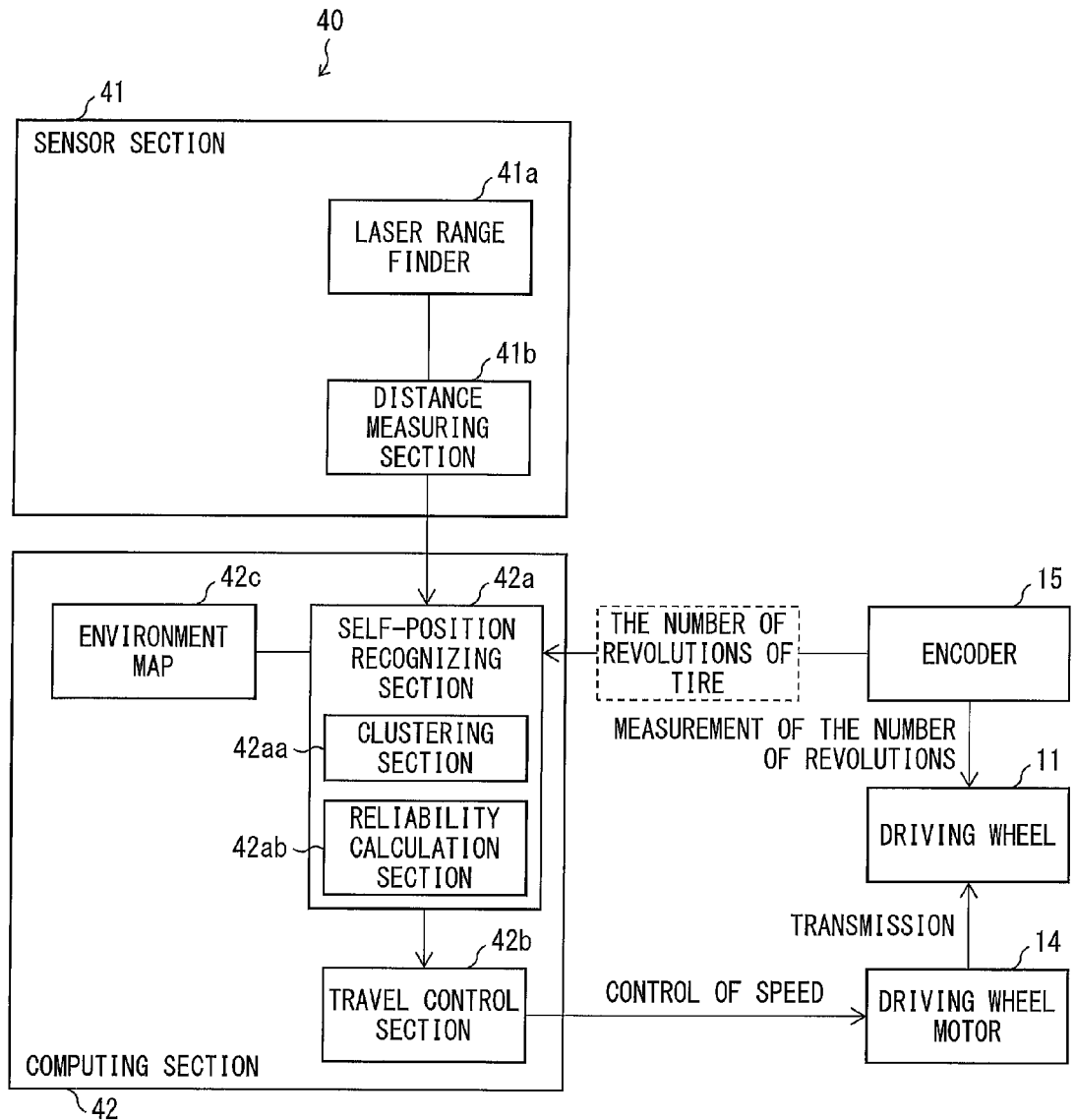
FIG. 1 is a block diagram illustrating a configuration of a sensor mechanism of a cleaning robot which is an example of an autonomous mobile body of Embodiment 1 of the present invention.

The following description discusses the sensor section 41 and the computing section 42 of the sensor mechanism 40 with reference to FIG. 1, and discusses a control system for controlling autonomous movement of the cleaning robot 1. FIG. 1 is a block diagram illustrating a configuration of the sensor mechanism 40.

As illustrated in FIG. 1, the sensor section 41 of the sensor mechanism 40 of Embodiment 1 includes (i) a laser range finder 41a and (ii) a distance measuring section 41b for measuring a distance to a wall M.

The laser range finder 41a is provided on a front side of the cleaning robot 1 as illustrated in (a) and (b) of FIG. 2. The laser range finder 41a includes (i) a light source (not illustrated) for emitting a laser beam toward a region in front of the cleaning robot 1 at a predetermined divergence angle and (ii) a light receiving section (not illustrated) for receiving a reflection of the laser beam emitted by the light source.

The distance measuring section 41b measures a distance to a position of an obstacle by which a laser beam has been reflected, based on (i) an angle at which the laser beam was emitted and (ii) a length of time between the emission and reflection of the laser beam. This allows the obstacle to be detected. The distance measuring section 41b thus carries out obstacle detection, i.e., sensing, by using a so-called principle of TOF (Time of flight).

The following description discusses, with reference to (a) and (b) of FIG. 2 and FIG. 3, a method of obtaining, by use of the laser range finder 41a, environment information of a region in front of the cleaning robot 1, i.e., a position and shape of an obstacle which is subjected to the sensing. FIG. 3 is a plan view illustrating how the wall M serving as a distance measurement object is irradiated with a laser beam which has been emitted from the laser range finder 41a of the cleaning robot 1.

First, as illustrated in (a) and (b) of FIG. 2, the cleaning robot 1 (i) emits a laser beam towards the region in front of the cleaning robot 1 from the laser range finder 41a and (ii) recognizes a position of an obstacle (i.e., a sensing point) which is existing in a sensing region located within a predetermined distance from the cleaning robot 1.

Specifically, as illustrated in FIG. 3, the laser range finder 41a emits a laser beam at a predetermined divergence angle. In so doing, a front region at a predetermined distance from the cleaning robot 1 is a measurable range, which is the sensing region. According to Embodiment 1, the wall M, which is an obstacle, falls within the sensing region. The laser beam emitted from the laser range finder 41a is reflected by the wall M which is an obstacle, and the laser beam thus reflected is received by the laser range finder 41a. In this way, a point, at which the emitted laser beam has been reflected by the wall M, is specified in accordance with (i) a self-position of the cleaning robot 1 when the laser beam was emitted, (ii) a direction in which the laser beam has been emitted from the laser range finder 41a, and (iii) a length of time between the emission of the laser beam and the reception of the reflected laser beam.

Data measured by the laser range finder 41a is outputted as a polar coordinate system which is defined by (i) a distance from a laser element to the wall M and (ii) an angle of a direction in which laser beam is emitted. For example, in a case where the laser range finder 41a measures a front region of 180 degrees in a traveling direction of the cleaning robot 1 at a resolution of 1.0 degree, the laser range finder 41a measures, by scanning once, 181 pieces of data corresponding to 0 degree to 180 degrees, respectively.

The data measured by the laser range finder 41a, i.e., the data on a distance, which (i) has been measured by the distance measuring section 41b and (ii) is a distance to the wall M that is an obstacle, is stored in a recording region provided in the computing section 42.

(Computing Section)

The following description discusses a configuration of the computing section 42 with reference to FIGS. 1 and 4. FIG. 4 is a plan view illustrating a grid map serving as an environment map used for autonomous movement of the cleaning robot.

According to Embodiment 1, as illustrated in FIG. 1, the computing section 42 controls an operation of the cleaning robot 1 as a whole. The computing section 42 includes (i) a storage region (not illustrated), such as a memory, which serves as a storage section, (ii) a self-position recognizing section 42a, (iii) a travel control section 42b, and (iv) an environment map 42c. The self-position recognizing section 42a includes a clustering section 42aa and a reliability calculation section 42ab.

(Storage Region)

The storage region (not illustrated) stores the environment map 42c containing (i) a program for controlling, in accordance with a control signal, (a) a movement speed, (b) a movement direction, and (c) a movement distance, and the like of the cleaning robot 1 and (ii) information regarding (a)

a movement region of the cleaning robot 1 and (b) a position and shape of the wall M which is an obstacle located in the movement region.

Embodiment 1 employs, as the environment map 42c, a grid map which (i) is illustrated in FIG. 4 and (ii) is created by virtually drawing grid lines connecting grid points which are arranged in the movement region at substantially constant intervals. The grid map is a map simulating the movement region of the cleaning robot 1. Presence information of the wall M and of another obstacle is registered on the grid map.

Note that a distance S between grid points in the grid map illustrated in FIG. 4 represents a scaled value on the grid map relative to a corresponding actual distance, and that the corresponding actual distance is obtained by multiplying the distance S between the grid points by the number of grids. That is, use of the environment map 42c makes it possible to calculate a distance from an estimated position, i.e., a current self-position X' (t−1) (described later) of the cleaning robot 1 to the wall M which distance can be measured by the laser range finder 41a.

(Self-Position Recognizing Section)

The following description discusses a configuration of the self-position recognizing section 42a with reference to FIG. 1.

According to Embodiment 1, the self-position recognizing section 42a recognizes a current self-position of the cleaning robot 1 by a Monte Carlo Localization method (MCL method). The Monte Carlo Localization method is a method in which a particle filter method is applied to position estimation. According to the Monte Carlo Localization method, (i) likelihood of samples (which are called particles) obtained from a proposed distribution, which is estimated in accordance with a past state of a distribution, is calculated and (ii) a current state of the distribution is estimated in accordance with the likelihood. In a case where (i) the proposed distribution may coincide with the current state of the distribution and (ii) the number of particles is infinite, an estimated self-position is converged to a current self-position, which is a true value.

Specifically, many particles (candidates for a solution of a posture of a robot), each of which has a probability as a weight, are distributed in a space (i.e., the movement region) which is represented by parameters (position (x,y), direction θ) indicating the posture of the robot. Then, a probability that the robot is located in a given region in the xyθ space is approximately expressed as a total of weights of respective particles located in the region. Further, a distribution of particles around a position at which the probability of the cleaning robot 1 being located is high is obtained by redistributing particles in accordance with the weights (likelihood described later) of the particles. The probability is calculated in accordance with the environment map 42c by using (i) an actual measurement result obtained by the sensor and (ii) a calculation result of a distance from a position of each of the candidates for a solution.

The following description discusses, with reference to FIGS. 5 and 6, an operation for obtaining a self-position of the cleaning robot 1 of Embodiment 1, which operation uses an algorithm of the Monte Carlo Localization method (MCL method). FIG. 5 is a flow chart showing the operation for obtaining a self-position of the cleaning robot 1, which operation uses the algorithm of the Monte Carlo Localization method (MCL method). FIG. 6 is a plan view illustrating how particles are redistributed in accordance with likelihood of the particles which likelihood is used in the Monte Carlo Localization method.

As illustrated in FIG. 5, when a system of the cleaning robot 1 is started, particles are randomly distributed in a movement region as an initial operation (S1). Subsequently, a calculation process is carried out for each control cycle while steps S2 through S6 (described later) serve as one cycle.

First, the particles are randomly moved in accordance with rotations of the driving wheels 11 (S2). For example, the particles are moved by use of (i) a speed of the cleaning robot 1 in a traveling direction and (ii) values obtained by varying each speed by use of a random number generated based on a normal distribution.

Next, in the step S3 serving as a step preceding a likelihood calculation in a self-position recognizing step to be carried out in the step S4 by which the step S3 is followed, the cleaning robot 1 calculates a reliability level to be used to (i) calculate likelihood of each of the particles and (ii) specify a direction of a laser beam emitted from the laser range finder 41a. Note that the calculation of the reliability level is described later in detail.

Next, the likelihood of each of the particles is calculated by using (i) a calculation result of a distance from a position of each of the particles and (ii) a measurement result obtained by the laser range finder 41a(S4). Note that the calculation result of the distance from the position of each of the particles refers to a distance from each of the particles to the wall M, which distance (i) is calculated based on the distance S between the grid points in the environment map 42c (see the grid map illustrated in FIG. 4) and (ii) can be correctly measured by the laser range finder 41a. The measurement result obtained by the laser range finder 41a refers to a distance from a self-position X'(t−1) of the cleaning robot 1 which self-position X' (t−1) has been measured immediately before by use of the laser beam whose direction has been specified in the step S3, i.e., a distance from the laser range finder 41a to the wall M which is an obstacle.

The likelihood in this case refers to likelihood of a distance to the wall M which distance is obtained by the calculation result of the distance from the position of each of the particles in a case where a probability density function follows a normal distribution in which the measurement result obtained by the laser range finder 41a is a median.

Note that the following equations (1) and (2) respectively represent (i) an upper limit ($Du_k$) of a measurement error range in which resolution is considered and (ii) a lower limit ($Dl_k$) of the measurement error range in which the resolution is considered.

[Math. 1]

$$Du_k = Dk + \Delta d \tag{1}$$

Dk: Calculation result of distance obtained by kth laser beam at position of particle Δd: Distance resolution of laser beam

[Math. 2]

$$Dl_k = Dk - \Delta d \tag{2}$$

Likelihood P(Dk) of a laser beam is represented by the following equation (3).

[Math. 3]

$$P(Dk) = \frac{1}{2}\left(1 + \text{erf}\left(\frac{Du_k - Z_k}{\sqrt{2\sigma^2}}\right)\right) \cdot \frac{1}{2}\left(1 + \text{erf}\left(\frac{Dl_k - Z_k}{\sqrt{2\sigma^2}}\right)\right) \quad (3)$$

$Z_k$: Measurement result obtained in direction of $k$th laser beam by laser range finder
$\sigma$: Variance
$\text{erf}(x)$: Error function Further, an error function erf(x) in the equation (3) is represented by the following equation (4).

[Math. 4]

$$\text{erf}(x) \approx \sqrt{1 - \exp\left(-x^2 \frac{4/\pi + ax^2}{1 + ax^2}\right)} \quad (4)$$

This makes it possible to calculate likelihood $P_i(D)$ of each particle by the following equation (5).

[Math. 5]

$$P_i(D) = \Pi P(Dk) \quad (5)$$

Next, in the step S5, the particles are redistributed in accordance with the likelihood of each of the particles which likelihood has been calculated in the step S4.

The particles are redistributed in the following manner. First, $W_{all}$, which is total of likelihood of all of the particles, is calculated by the following equation (6).

[Math. 6]

$$W_{all} = \Sigma P_i(D) \quad (6)$$

Then, the particles are rearranged, with a probability of $P_i(D)/W_{all}$, at respective positions at which particles were located before the redistribution.

Specifically, first, a container in accordance with likelihood of old particles is prepared as illustrated in FIG. 6. Next, new particles are distributed in the container, and then the new particles contained in the container are rearranged at positions of the respective old particles. The redistribution of the particles provides a distribution in the measurement result in which distribution particles are distributed around a particle having a highest likelihood.

Next, in the step S6, a current self-position X(t) of the cleaning robot 1 is calculated (recognized) according to an average of the positions of the respective redistributed particles. Alternatively, the self-position X(t) can be considered as a position where a particle has a highest likelihood.

The self-position recognizing section 42a sequentially recognizes a current self-position of the cleaning robot 1 by repeating the steps S2 through S6 described above.

Then, information on the current self-position is transmitted to the travel control section 42b illustrated in FIG. 1. The travel control section 42b transmits, in accordance with the information thus transmitted from the self-position detecting section 42a, a command to the driving wheel motor 14 so that the cleaning robot 1 operates as intended. This allows the cleaning robot 1 to travel so as to avoid the wall M by referring to the environment map 42c.

The following description discusses, with reference to FIGS. 7 through 10, a method of calculating a reliability level, which method is used in the step S3 illustrated in FIG. 5. FIG. 7 is a flow chart showing a reliability calculation routine used in the Monte Carlo Localization method. FIG. 8 is a plan view illustrating how obstacle measurement points, which have been detected by the sensor section 41 of the cleaning robot 1, are clustered. FIG. 9 is a plan view illustrating how obstacle clusters detected by the sensor section 41 are classified by types. FIG. 10 is a plan view illustrating how the laser range finder carries out measurement in an actual environment. FIG. 11 is a plan view illustrating a case where obstacle measurement points are clustered based on results of calculating positions of obstacles in an environment map in a case where a temporary current position of the cleaning robot 1 is correct. FIG. 12 is a plan view illustrating a case where obstacle measurement points are clustered based on results of calculating positions of obstacles in an environment map in a case where a temporary current position of the cleaning robot 1 is incorrect. FIG. 13 is a plan view illustrating how the positions of the obstacle measurement points illustrated in FIG. 11 are superimposed on the positions of the obstacle measurement points illustrated in FIG. 12. FIG. 14 is a plan view illustrating how the positions of the obstacle measurement points illustrated in FIG. 11 are superimposed on the positions of the obstacle measurement points illustrated in FIG. 13.

The reliability calculation in the step S3 shown in FIG. 5 is carried out by the reliability calculation section 42ab illustrated in FIG. 1.

Specifically, as illustrated in FIG. 7, the reliability calculation section 42ab first clusters obstacle measurement points detected by the sensor section 41 (S11). That is, the reliability calculation section 42ab divides collections of data into more than one group in accordance with similarity between the pieces of data. Among various possible methods of carrying out the clustering obstacle measurement points, Embodiment 1 employs a method carried out as follows. In a case where a distance between adjacent obstacle measurement points is less than a threshold with respect to a measurement direction of the laser range finder 41a, such obstacle measurement points are treated as one cluster. This provides, for example, a plan view (as illustrated in FIG. 8) which shows that obstacle measurement points detected by the sensor section 41 are clustered so as to constitute a wall M. That is, in FIG. 8, in a case where distances between adjacent obstacle measurement points (black dots shown in FIG. 8) are each less than a threshold in a corresponding one of laser beam directions in which the laser range finder 41a has successfully carried out a distance measurement, such obstacle measurement points are classified as one cluster. This causes each of parts shown by respective dash-dot lines in FIG. 8 to be recognized as an individual obstacle cluster. Note that examples of alternative methods of clustering obstacle measurement points encompass (i) a Mean Shift method and (ii) a method in which obstacle measurement points are clustered by use of a characteristic other than a geometric distance.

Next, as illustrated in FIG. 7, types of respective clusters are determined (S12). According to Embodiment 1, the clusters are classified into three types below. The following description indicates conditions for the classification.

Straight line cluster: A correlation coefficient is not less than 0.9

Curved line cluster: A correlation coefficient is less than 0.9; and change in inclination of a straight line connecting obstacle measurement points which inclination is defined at a position of each of the obstacle measurement points is not more than 10 degrees Other-type cluster: Cluster other than the straight line cluster and the curved line cluster The clusters are classified into one of the three types and are used when a comparison is carried out.

Next, in order to determine whether or not each of the classified clusters is a straight line cluster, a correlation coefficient between an x coordinate and a y coordinate of each of the positions at which the obstacle measurement points are located is calculated for each of the classified clusters.

[Calculation of Correlation Coefficient]

In calculating the correlation coefficient, it is herein assumed that an obstacle measurement point $O_i$ illustrated in (a) of FIG. 9 is obtained as a cluster.

In calculating the correlation coefficient for the cluster, a position $(x_i, y_i)$ of the obstacle measurement point $O_i$ can be calculated by the following equation.

$$x_i = D_i * \cos \theta_i$$

$$y_i = D_i * \sin \theta_i,$$ [Math. 7], where $\{(\theta_i, D_i)\}(i=1, 2, \ldots, n)$, $\{(x_i, y_i)\}(i=1, 2, \ldots, n)$ where $D_i$ indicates a distance to the obstacle measurement point $O_i$ in a measurement direction $\theta_i$ of the laser range finder 41a.

A correlation coefficient C can be calculated by the following equation.

[Math. 8]

$$C = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

$\bar{x}, \bar{y}$: Average of $x_i, y_i$

In a case where an absolute value of the correlation coefficient C thus calculated is not less than a threshold, a target cluster serves as a straight line cluster. It is herein assumed that the target cluster serves as the straight line cluster in a case where the correlation coefficient C≥0.9, which is the threshold.

Next, a curved line cluster is extracted from clusters other than the straight line cluster.

[Calculation of Inclination in Cluster Other than Straight Line Cluster]

In a cluster which is not a straight line cluster, an inclination of a straight line connecting obstacle measurement points is calculated, which inclination is defined in accordance with a positional relationship between adjacent obstacle measurement points. The inclination is calculated by approximating a distribution of reference points by a linear equation. An inclination $a_i$ at an i-th position is represented by the following equation.

[Math. 9]

$$a_i = \mathrm{atan}\left(\frac{(2*l+1)\sum_{k=i-l}^{i+l} x_k y_k - \sum_{k=i-l}^{i+l} x_k \sum_{k=i-l}^{i+l} y_k}{\sum_{k=i-l}^{i+l} x_k^2 - \left(\sum_{k=i-l}^{i+l} x_k\right)^2}\right)$$

$2*l + 1$: The number of reference points

The inclination $a_i$ is calculated within a range of inclinations $a_1$ through $a_{n-1}$. In a case where $\Delta a = a_i - a_{i+1}$ is less than a threshold throughout all the obstacle measurement points, a cluster in which the inclination $a_i$ has been calculated is treated as a curved line cluster.

The following description specifically discusses the classification of clusters with reference to (a), (b), (c), and (d) of FIG. 9. (a), (b), (c), and (d) of FIG. 9 are plan views illustrating how obstacle clusters detected by the sensor section 41 of the cleaning robot 1 are classified by types.

First, as illustrated in (a) of FIG. 9, in a case where obstacle measurement points belonging to a cluster are detected, inclinations $a_i$ of straight lines connecting obstacle measurement points are sequentially calculated in the following manner.

An inclination $a_1$ of the straight line at $O_1$ is not calculated.

An inclination $a_2$ of the straight line at $O_2$ is calculated by using reference points $O_1$ through $O_3$ as illustrated in (b) of FIG. 9.

An inclination $a_3$ of the straight line at $O_3$ is calculated by using reference points $O_2$ through $O_4$ as illustrated in (c) of FIG. 9.

An inclination $a_4$ of the straight line at $O_4$ is calculated by using reference points $O_3$ through $O_5$ as illustrated in (d) of FIG. 9.

No inclination of the straight line at $O_5$ is calculated.

Note that in a case where the inclination $a_2$-$a_3$ and the inclination $a_3$-$a_4$ are each less than a threshold, a cluster is treated as a curved line cluster. A cluster which is neither the straight line cluster nor the curved line cluster is treated as an other-type cluster.

The clusters are thus classified into three types: the straight line cluster, the curved line cluster, and the other-type cluster.

Next, as shown in FIG. 7, a position of an obstacle in the environment map 42c is calculated in accordance with a temporary current position of the cleaning robot 1 (S13). According to Embodiment 1, a type of a cluster of obstacle data which is obtained when a measurement has been carried out on the environment map 42c by use of the laser range finder 41a is also determined as with the step S12.

Specifically, as illustrated in FIG. 10, a measurement carried out by the laser range finder 41a in an actual environment shows that obstacles which do not exist in the environment map 42c exist as shown as a hatched region in FIG. 10.

FIG. 11 illustrates how obstacle measurement points are clustered based on results of calculating positions of the obstacles in the environment map 42c in a case where the temporary current position of the cleaning robot 1 is correct. FIG. 12 illustrates how obstacle measurement points are clustered based on results of calculating positions of the obstacles in the environment map 42c in a case where the temporary current position of the cleaning robot 1 is incorrect. Note that, in FIG. 12, the positions of the obstacle are calculated in directions different from respective actual directions. According to Embodiment 1, the obstacle data is obtained in a case where the measurement is carried out on the environment map 42c by use of the laser range finder 41a. Alternatively, it is also possible to employ, for example, a method of directly extracting a figure of an object from the grid map.

Next, as illustrated in FIG. 7, a reliability level of a cluster detected by the sensor section 41 is calculated in accordance with (i) positions of obstacles of the cluster and (ii) positions of obstacles of a cluster in the environment map 42c. According to Embodiment 1, it is determined that the reliability level is 1 in a case where the cluster detected by the sensor section 41 and the cluster in the environment map 42c are compared and determined to coincide with each other. In contrast, the reliability level is 0 in a case where the cluster detected by the sensor section 41 and the cluster in the environment map 42c are compared and determined not to coincide with each other. The reliability level is determined in accordance with the following conditions.

Cluster other than straight line cluster: clusters are determined to coincide with each other in a case where (i) a shortest distance between the clusters is not more than a threshold and (ii) the clusters are identical in type.

Straight line cluster: clusters are determined not to coincide with each other in a case where (i) the conditions to be applied to the cluster other than the straight line are met and (ii) a difference in inclination between straight lines is within the threshold.

Specifically, the positions of the respective obstacle measurement points in a case where the temporary current position of the cleaning robot 1 is correct (see FIG. 11) are superimposed on the positions of the respective obstacle measurement points in a case where the temporary current position of the cleaning robot 1 is incorrect (see FIG. 12). As a result, in a case where the temporary current position of the cleaning robot 1 is correct as illustrated in FIG. 13, no obstacle cluster calculated in accordance with the environment map 42c exists near the obstacle clusters which (i) are measured by the laser range finder 41a and (ii) do not exist in the environment map 42c. This makes it possible to determine an obstacle which does not exist in the environment map 42c. Specifically, obstacle clusters shown by respective dash-dot-dot lines in FIG. 13 do not coincide with obstacle clusters calculated in accordance with the environment map 42c, and the reliability level is therefore determined to be 0.

Next, FIG. 14 shows how the positions of the obstacle measurement points in a case where the temporary current positions of the cleaning robot 1 are correct (shown in FIG. 11) are superimposed on the positions of the obstacle measurement points shown in FIG. 13. As a result, FIG. 14 indicates the following points.

(1) An R1 cluster is located near a V1 cluster and is identical in type to the V1 cluster. Further, the R1 cluster and the V1 cluster have a small difference in inclination between the straight lines. Therefore, the R1 cluster coincides with the V1 cluster.

(2) An R2 cluster is located near the V1 cluster, but differs in type from the V1 cluster. Therefore, the R2 cluster does not coincide with the V1 cluster.

(3) An R3 cluster is located near the V1 cluster and a V2 cluster. The R3 cluster is identical in type to the V1 cluster, but the R3 cluster and the V1 cluster have a large difference in inclination between the straight lines. Therefore, the R3 cluster does not coincide with the V1 cluster. Meanwhile, the R3 cluster is identical in type to the V2 cluster, and the R3 cluster and the V2 cluster have a small difference in inclination between the straight lines. Therefore, the R3 cluster coincides with the V2 cluster.

(4) An R4 cluster is located near the V2 cluster and a V3 cluster. The V2 cluster differs in type from the R4 cluster, and therefore the R4 cluster does not coincide with the V2 cluster. The V3 cluster is a curved line cluster and is identical in type to the R4 cluster. Therefore, the R4 cluster coincides with the V3 cluster.

(5) An R5 cluster is located near the V3 cluster, but the R5 cluster differs in type from the V3 cluster. Therefore, the R5 cluster does not coincide with the V3 cluster.

The R1 cluster, the R3 cluster, and the R4 cluster thus have clusters which coincide with the R1 cluster, the R3 cluster, and the R4 cluster, respectively. Therefore, the R1 cluster, the R3 cluster, and the R4 cluster are each determined to have a reliability level of 1.

Therefore, even in a case where the temporary current position of the cleaning robot 1 differs from the actual current position of the cleaning robot 1, it is possible to determine an obstacle which does not exist in the environment map 42c. Note that a reliability level of a cluster can be used as a reliability level of an obstacle having obstacle measurement points belonging to the cluster. Alternatively, a reliability level of an obstacle can be changed in accordance with a distribution of obstacle measurement points in the cluster. That is, according to Embodiment 1, in a case where a reliability level of an obstacle is 1, the obstacle is determined as an obstacle existing in the environment map 42c. However, the present invention is not necessarily limited as such. In a case where an obtained reliability level of an object is greater than a reference reliability level, the obstacle can be determined as an obstacle existing in the environment map 42c.

By thus carrying out the steps S11 through S14, a reliability level of an obstacle can be calculated.

According to Embodiment 1, the clusters are compared with each other. Note, however, that the present invention is not necessarily limited as such. Alternatively, position information of an obstacle, which position information is calculated in accordance with the environment map 42c, can be figure information, for example.

Therefore, the cleaning robot 1 of Embodiment 1 which cleaning robot 1 serves as an autonomous mobile body includes: a sensor section 41 for measuring, by emitting a beam, a distance from the sensor section 41 to each of a plurality of obstacles located in the movement region; and a self-position recognizing section 42a for recognizing the self-position by (i) calculating a self-position candidate in accordance with the distance and designating the distance as a sensor distance, (ii) comparing the sensor distance with a map distance which extends from the self-position candidate to the each of the plurality of obstacles and which is calculated in accordance with an environment map 42c containing information on a position of the each of the plurality of obstacles and (iii) correcting the self-position candidate.

The configuration allows the cleaning robot 1 to move in the movement region while recognizing a self-position.

According to the cleaning robot 1 of Embodiment 1, the self-position recognizing section 42a includes a clustering section 42aa for (i) grouping distance measurement points of the each of the plurality of obstacles into clusters, the distance measurement points having been measured by use of a beam emitted from the sensor section 41 and (ii) recognizing the each of the plurality of obstacles. This facilitates recognizing the each of the plurality of obstacles.

This makes it possible to provide the cleaning robot 1 capable of (i) reducing a probability of treating, as an obstacle not existing in an environment map, an obstacle existing in the environment map and (ii) improving accuracy of position estimation.

According to the cleaning robot 1 of Embodiment 1, while obstacle measurement points are grouped into the clusters, the clustering section treats adjacent obstacle measurement points as those of one cluster in a case where a geometric distance between the adjacent obstacle measurement points is less than a threshold.

Therefore, by determining whether a geometrical distance between adjacent obstacle measurement points is less or more than a threshold, it is possible to easily recognize whether or not obstacles are individual objects.

This makes it possible to easily and accurately compare clusters of obstacles which have been obtained by use of a beam emitted from the sensor section 41 with obstacles existing in the environment map 42c.

According to the cleaning robot 1 of Embodiment 1, while obstacle measurement points are grouped into the clusters, the clustering section 42aa calculates a feature amount of each of the clusters in accordance with a distribution of obstacle measurement points $O_1$ through $O_5$ belonging to the each of the clusters.

This makes it possible to represent a feature amount of each of clusters as, for example, a straight line or a curved line. As a result, it is possible to compare the clusters by comparing lines into which shapes of respective obstacles are simplified. This makes it possible to more easily and accurately compare the obstacles existing in the environment map 42c with the obstacles which have been obtained by use of a beam emitted from the sensor section 41.

According to the cleaning robot 1 of Embodiment 1, the self-position recognizing section 42a includes a reliability calculation section 42ab for calculating a reliability level of existence of the each of the plurality of obstacles by comparing a position of each of clusters, which have been obtained by causing the clustering section 42aa to group the obstacle measurement points of the each of the plurality of obstacles in accordance with the sensor distance, with a position of the each of the plurality of obstacles, which position of the each of the plurality of obstacles has been calculated in accordance with the environment map 42c; and in a case where the self-position recognizing section 42a calculates a self-position candidate of the autonomous mobile body in accordance with a distance to the each of the plurality of obstacles which distance has been measured by use of a beam emitted from the sensor section 41, the self-position recognizing section 42a calculates the self-position candidate by selecting an obstacle having a reliability level which (i) has been calculated by the reliability calculation section 42ab and (ii) is greater than a reference reliability level.

This increases a probability that the obstacles calculated by use of a beam emitted from the sensor section 41 coincides with the obstacles existing in the environment map 42c. Therefore, the self-position recognizing section 42a can accurately recognize a self-position.

This makes it possible to provide the cleaning robot 1 capable of (i) reducing a probability of treating, as an obstacle not existing in an environment map, an obstacle existing in the environment map 42c due to inaccuracy of a temporary current position of the cleaning robot 1 and (ii) improving accuracy of position estimation.

According to the cleaning robot 1 of Embodiment 1, in accordance with the self-position candidate, the clustering section 42aa groups, into clusters, obstacle measurement points of each of the plurality of obstacles whose position has been calculated in accordance with the environment map 42c; and the reliability calculation section 42ab calculates the reliability by comparing (i) each of the clusters of the obstacle measurement points of the each of the plurality of obstacles whose position has been calculated in accordance with the environment map 42c and (ii) a corresponding one of the clusters which have been obtained by grouping the obstacle measurement points in accordance with the sensor distance.

Therefore, the clustering section 42aa groups, into clusters, not only obstacles based on the sensor distance but also obstacles calculated in accordance with the environment map 42c. As a result, (i) the clusters of the obstacles based on the sensor distance and (ii) the clusters of the obstacles calculated in accordance with the environment map 42c are compared with each other as simple lines. This makes it possible to more easily and accurately compare the obstacles existing in the environment map 42c with the obstacles which have been obtained by use of a beam emitted from the sensor section 41.

Note that the present invention is not limited to Embodiment 1, but can be altered in many ways within the scope of the present invention.

For example, Embodiment 1 employs the laser range finder 41a for the sensor section 41. However, the present invention is not necessarily limited as such. According to the present invention, it is only necessary that a sensor, which emits a beam and obtains information from the beam reflected by an object(s), be configured to obtain information from an object(s) in a wide angle of region by carrying out scanning or the like. Specifically, for example, the sensor of the present invention only needs to be a device, such as an ultrasonic distance measuring sensor, an infrared distance measuring sensor, or a millimeter wave radar, which carries out scanning or emits a beam in many directions.

Embodiment 1 employs the Monte Carlo Localization method (MCL method). Note, however, that the present invention is not necessarily limited as such. Alternatively, it is also possible to employ an extended Kalman filter method.

Embodiment 2

The following description discusses another embodiment of the present invention with reference to FIG. 15. Note that configurations other than those described in Embodiment 2 are identical to the configurations described in Embodiment 1. For convenience, members having functions identical to those illustrated in the drawing of Embodiment 1 are given identical reference signs, and descriptions on such members are omitted.

The cleaning robot 1 of Embodiment 1, which cleaning robot 1 serves as an autonomous mobile body, uses a grid map as an environment map 42c. Meanwhile, a cleaning robot 1 of Embodiment 2, which cleaning robot 1 serves as an autonomous mobile body, differs from the cleaning robot 1 of Embodiment 1 in that the cleaning robot 1 of Embodiment 2 employs a form in which an obstacle object is directly drawn in an environment map.

The following description discusses, with reference to FIG. 15, a case where the cleaning robot of Embodiment 2 is realized by using an environment map 42c' in which an obstacle object is directly drawn. FIG. 15 is a plan view illustrating a configuration of the environment map 42c'.

The environment map 42c' of Embodiment 2 is an object-type environment map in which an obstacle object is directly drawn as illustrated in FIG. 15. According to the object-type environment map, an obstacle is represented by (i) coordinates of a base point and (ii) a type of a line.

Specifically, according to the environment map 42c', a wall M, which is shown by bold solid lines in FIG. 15 and is measurable by the laser range finder 41a, is rectangular and can be represented by straight lines. Meanwhile, a wall M shown by a bold broken line in FIG. 15 (i) is a circle and (ii) can be drawn based on (a) coordinates of a center of the circle and (b) a diameter of the circle.

Note here that it is possible to flexibly draw the grid-type environment map 42c employed in Embodiment 1 even in a case where an obstacle(s) has a complicated shape. However, in a case where a smaller number of objects exist, a greater amount of calculation is required.

Meanwhile, it is difficult to draw the object-type environment map 42c' employed in Embodiment 2 in a case where an obstacle(s) has a complicated shape. However, the environment map 42c' has an advantage in that it is possible to carry out a calculation at a high speed in a case where an obstacle(s) has a shape allowing for a general solution of a distance between a position of a particle and an object.

Embodiment 3

The following description discusses another embodiment of the present invention with reference to FIG. 16. Note that configurations other than those described in Embodiment 3 are identical to the configurations described in Embodiments 1 and 2. For convenience, members having functions identical to those illustrated in the drawings of Embodiment 1 and 2 are given identical reference signs, and descriptions on such members are omitted.

The cleaning robot 1 of Embodiment 1, which cleaning robot 1 serves as an autonomous mobile body, is configured such that in a case where a distance between adjacent obstacle measurement points is less than a threshold with respect to a measurement direction of the laser range finder 41a, such obstacle measurement points are treated as one cluster. Meanwhile, a cleaning robot 1 of Embodiment 3, which cleaning robot 1 serves as an autonomous mobile body, differs from the cleaning robot 1 of Embodiment 1 in terms of standards for determining whether or not to treat obstacle measurement points as one cluster.

The following description discusses, with reference to (a) and (b) of FIG. 16, standards for determining whether or not to treat obstacle measurement points as one cluster according to the cleaning robot of Embodiment 3. (a) of FIG. 16 is a plan view for describing standards according to Embodiment 3, which standards employ a method of treating, as a cluster, object measurement points located near a detected straight line or circle. (b) of FIG. 16 is a plan view for describing a detection method of Embodiment 1 which detection method (i) is carried out by the self-position recognizing section 42a and (ii) is carried out such that in a case where a distance between adjacent obstacle measurement points is less than a threshold with respect to a measurement direction of the laser range finder 41a such adjacent obstacle measurement points are treated as one cluster.

In a case where, as with Embodiment 1, adjacent obstacle measurement points are treated as one cluster when a distance between the obstacle measurement points is less than the threshold, the following problem may arise: The number of clusters may increase in a case where a distant part of a wall M, which distant part is distant from the cleaning robot, is detected as illustrated in (b) of FIG. 16.

Therefore, according to Embodiment 3, it is made possible to detect a straight line or a circle by using a Hough transform which is used for image processing.

Specifically, as illustrated in (a) of FIG. 16, obstacle measurement points, which are located near a detected straight line or circle, are treated as a cluster. This, even in a case where a distant part of a wall M is detected, allows such obstacle measurement points to be treated as one cluster.

Embodiment 4

The following description discusses another embodiment of the present invention. Note that configurations other than those described in Embodiment 4 are identical to the configurations described in Embodiments 1 through 3. For convenience, members having functions identical to those illustrated in the drawings of Embodiment 1 through 3 are given identical reference signs, and descriptions on such members are omitted.

According to the cleaning robot 1 which has been described in each of Embodiments 1 through 3 and which serves as an autonomous mobile body, a control block of the computing section 42, particularly, the self-position recognizing section 42a can be realized by a logic circuit (hardware) provided in an integrated circuit (IC chip) or the like or can be alternatively realized by software as executed by a CPU (Central Processing Unit).

In the latter case, the computing section 42 includes a CPU that executes instructions of a program that is software realizing the foregoing functions; ROM (Read Only Memory) or a storage device (each referred to as "storage medium") in which the program and various kinds of data are stored so as to be readable by a computer (or a CPU); and RAM (Random Access Memory) in which the program is loaded.

An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Main Points]

An autonomous mobile body (cleaning robot 1) of the first aspect of the present invention is an autonomous mobile body which moves in a movement region while recognizing a self-position of the autonomous mobile body, the autonomous mobile body including: a sensor section 41 for measuring, by emitting a beam, a distance from the sensor section 41 to each of a plurality of obstacles located in the movement region; and a self-position recognizing section 42a for recognizing the self-position by (i) calculating a self-position candidate in accordance with the distance and designating the distance as a sensor distance, (ii) comparing the sensor distance with a map distance which extends from the self-position candidate to the each of the plurality of obstacles and which is calculated in accordance with an environment map 42c containing information on a position of the each of the plurality of obstacles and (iii) correcting the self-position candidate, the self-position recognizing section 42a including a clustering section 42aa for (i) grouping distance measurement points of the each of the plurality of obstacles into clusters, the distance measurement points having been measured by use of a beam emitted from the sensor section 41 and (ii) recognizing the each of the plurality of obstacles.

According to the invention, the self-position recognizing section recognizes the self-position by (i) calculating a self-position candidate in accordance with the distance and designating the distance as a sensor distance, (ii) comparing the sensor distance with a map distance which extends from the self-position candidate to the each of the plurality of obstacles and which is calculated in accordance with an environment map containing information on a position of the each of the plurality of obstacles and (iii) correcting the self-position candidate, the self-position recognizing section including a clustering section for (i) grouping distance measurement points of the each of the plurality of obstacles into clusters, the distance measurement points having been measured by use of a beam emitted from the sensor section and (ii) recognizing the each of the plurality of obstacles.

This allows the autonomous mobile body to move in the movement region while recognizing a self-position.

Such a type of autonomous mobile body estimates an obstacle by emitting a beam from a sensor section and measuring a distance from the sensor section to the obstacle. Therefore, in a case where there exist a plurality of obstacles, it is difficult to accurately determine that the plurality of obstacles are individual obstacles. As a result, an obstacle existing in an environment map is treated as an obstacle not existing in the environment map, and therefore accuracy of position estimation deteriorates.

Meanwhile, according to the present invention, the self-position recognizing section includes a clustering section for (i) grouping distance measurement points of the each of the plurality of obstacles into clusters, the distance measurement points having been measured by use of a beam emitted from the sensor section and (ii) recognizing the each of the plurality of obstacles. Therefore, the clustering section (i) groups the distance measurement points of the each of the plurality of obstacles, the distance measurement points having been measured by use of a beam emitted from the sensor section and (ii) recognizes the each of the plurality of obstacles. This facilitates recognizing the each of the plurality of obstacles.

This makes it possible to provide an autonomous mobile body capable of (i) reducing a probability of treating, as an obstacle not existing in an environment map, an obstacle existing in the environment map and (ii) improving accuracy of position estimation.

In a second aspect of the present invention, an autonomous mobile body (cleaning robot 1) is preferably arranged such that, in the first aspect of the present invention, while obstacle measurement points are grouped into the clusters, the clustering section treats adjacent obstacle measurement points as those of one cluster in a case where a geometric distance between the adjacent obstacle measurement points is less than a threshold.

Therefore, by determining whether a geometrical distance between adjacent obstacle measurement points is less or more than a threshold, it is possible to easily recognize whether or not obstacles are individual objects.

This makes it possible to easily and accurately compare clusters of the obstacles which have been obtained by use of a beam emitted from the sensor section with obstacles existing in the environment map.

In a third aspect of the present invention, an autonomous mobile body (cleaning robot 1) is preferably arranged such that, in the first or second aspect of the present invention, while obstacle measurement points are grouped into the clusters, the clustering section 42aa calculates a feature amount of each of the clusters in accordance with a distribution of obstacle measurement points through belonging to the each of the clusters.

This makes it possible to represent a feature amount of each of clusters as, for example, a straight line or a curved line. As a result, it is possible to compare the clusters by comparing lines in which shapes of respective obstacles are simplified. This makes it possible to more easily and accurately compare the obstacles existing in the environment map with the obstacles which have been obtained by use of a beam emitted from the sensor section.

In a fourth aspect of the present invention, an autonomous mobile body (cleaning robot 1) is preferably arranged such that, in the first, second, or third aspect of the present invention, the self-position recognizing section 42a includes a reliability calculation section 42ab for calculating a reliability level of existence of the each of the plurality of obstacles by comparing a position of each of clusters, which have been obtained by causing the clustering section 42aa to group the obstacle measurement points of the each of the plurality of obstacles in accordance with the sensor distance, with a position of the each of the plurality of obstacles, which position of the each of the plurality of obstacles has been calculated in accordance with the environment map 42c; and in a case where the self-position recognizing section 42a calculates a self-position candidate of the autonomous mobile body in accordance with a distance to the each of the plurality of obstacles which distance has been measured by use of a beam emitted from the sensor section 41, the self-position recognizing section 42a calculates the self-position candidate by selecting an obstacle having a reliability level which (i) has been calculated by the reliability calculation section 42ab and (ii) is greater than a reference reliability level.

Therefore, in a case where the self-position recognizing section calculates a self-position candidate of the autonomous mobile body in accordance with a distance to the each of the plurality of obstacles which distance has been measured by use of a beam emitted from the sensor section, the self-position recognizing section calculates the self-position candidate by selecting an obstacle having a reliability level which (i) has been calculated by the reliability calculation section and (ii) is greater than a reference reliability level. This increases a probability that the obstacles calculated by use of a beam emitted from the sensor section coincides with the obstacles existing in the environment map. Therefore, the self-position recognizing section can accurately recognize a self-position.

This makes it possible to provide an autonomous mobile body capable of (i) reducing a probability of treating, as an obstacle not existing in an environment map, an obstacle existing in the environment map due to inaccuracy of a temporary current position of the autonomous mobile body and (ii) improving accuracy of position estimation.

In a fifth aspect of the present invention, an autonomous mobile body (cleaning robot 1) is preferably arranged such that, in the fourth aspect of the present invention, in accordance with the self-position candidate, the clustering section 42aa groups, into clusters, obstacle measurement points of each of the plurality of obstacles whose position has been calculated in accordance with the environment map 42c; and the reliability calculation section 42ab calculates the reliability by comparing (i) each of the clusters of the obstacle measurement points of the each of the plurality of obstacles whose position has been calculated in accordance with the environment map 42c and (ii) a corresponding one of the clusters which have been obtained by grouping the obstacle measurement points in accordance with the sensor distance.

Therefore, the clustering section of the self-position recognizing section groups, into clusters, not only obstacles based on the sensor distance but also obstacles calculated in accordance with the environment map. As a result, (i) the clusters of the obstacles based on the sensor distance and (ii) the clusters of the obstacles calculated in accordance with the environment map are compared with each other as simple lines. This makes it possible to more easily and accurately compare the obstacles existing in the environment map with the obstacles which have been obtained by use of a beam emitted from the sensor section.

INDUSTRIAL APPLICABILITY

The present invention is applicable to, for example, an autonomous mobile body such as (i) a cleaning device for commercial use and (ii) a conveying robot for factory use.

REFERENCE SIGNS LIST

1: Cleaning robot (autonomous mobile body)
10: Driving mechanism
11: Driving wheel
12: Trailing wheel
13: Battery
14: Driving wheel motor
16: Travel control lever
20: Cleaning mechanism
21: Washing liquid tank
22: Washing liquid discharge section
24: Waste liquid tank
25: Cleaning brush
26: Brush motor
30: Housing
31: Protection member
32: Operation panel
33: Emergency stop switch
34: Handle
40: Sensor mechanism
41: Sensor section
41$a$: Laser range finder
41$b$: Distance measuring section
42: Computing section
42$a$: Self-position recognizing section
42$aa$: Clustering section
42$ab$: Reliability calculation section
42$b$: Travel control section
42$c$: Environment map
42$c'$: Environment map
M: Wall (obstacle)
O: Obstacle (obstacle measurement point)

The invention claimed is:

1. An autonomous mobile body which moves in a movement region while recognizing a self-position of the autonomous mobile body, the autonomous mobile body comprising:
a sensor that measures, by emitting a beam, a distance from the sensor to each of a plurality of obstacles located in the movement region; and
self-position recognizing circuitry that recognizes the self-position by (i) calculating a self-position candidate in accordance with the distance and designating the distance as a sensor distance, (ii) comparing the sensor distance with a map distance which extends from the self-position candidate to the each of the plurality of obstacles and which is calculated in accordance with an environment map containing information on a position of the each of the plurality of obstacles and (iii) correcting the self-position candidate, wherein
the self-position recognizing circuitry includes clustering circuitry that (i) groups distance measurement points of the each of the plurality of obstacles into clusters, the distance measurement points having been measured by use of a beam emitted from the sensor and (ii) recognizes the each of the plurality of obstacles, and
the clustering circuitry calculates a feature amount of a shape of each of the clusters in accordance with a distribution of obstacle measurement points belonging to each of the clusters.

2. The autonomous mobile body as set forth in claim 1, wherein, while obstacle measurement points are grouped into the clusters, the clustering circuitry treats adjacent obstacle measurement points as those of one cluster in a case where a geometric distance between the adjacent obstacle measurement points is less than a threshold.

3. The autonomous mobile body as set forth in claim 1, wherein:
the self-position recognizing circuitry includes:
reliability calculation circuitry that calculates a reliability level of existence of the each of the plurality of obstacles by comparing a position of each of clusters, which have been obtained by causing the clustering circuitry to group the obstacle measurement points of the each of the plurality of obstacles in accordance with the sensor distance, with a position of the each of the plurality of obstacles, which position of the each of the plurality of obstacles has been calculated in accordance with the environment map; and
in a case where the self-position recognizing circuitry calculates a self-position candidate of the autonomous mobile body in accordance with a distance to the each of the plurality of obstacles which distance has been measured by use of a beam emitted from the sensor, the self-position recognizing circuitry calculates the self-position candidate by selecting an obstacle having a reliability level that (i) has been calculated by the reliability calculation circuitry and (ii) is greater than a reference reliability level.

4. The autonomous mobile body as set forth in claim 3, wherein:
in accordance with the self-position candidate, the clustering circuitry groups, into clusters, obstacle measurement points of each of the plurality of obstacles whose position has been calculated in accordance with the environment map; and
the reliability calculation circuitry calculates the reliability by comparing (i) each of the clusters of the obstacle measurement points of the each of the plurality of obstacles whose position has been calculated in accordance with the environment map and (ii) a corresponding one of the clusters which have been obtained by grouping the obstacle measurement points in accordance with the sensor distance.

5. The autonomous mobile body as set forth in claim 1, wherein the clustering circuitry calculates the feature amount of the shape of the each of the clusters by approximating the feature amount of the shape of the each of the clusters to a straight line or a curved line.

* * * * *